US011777790B2

(12) United States Patent
Asveren et al.

(10) Patent No.: US 11,777,790 B2
(45) Date of Patent: Oct. 3, 2023

(54) COMMUNICATIONS METHODS AND APPARATUS FOR MIGRATING A NETWORK INTERFACE AND/OR IP ADDRESS FROM ONE POD TO ANOTHER POD IN A KUBERNETES SYSTEM

(71) Applicant: Ribbon Communications Operating Company, Inc., Westford, MA (US)

(72) Inventors: Tolga Asveren, Bordentown, NJ (US); Souvik Dey, Groton, MA (US); Mark St. Pierre, Groton, MA (US); Suyash Suhas Karmarkar, Nashua, NH (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

(21) Appl. No.: 16/850,954

(22) Filed: Apr. 16, 2020

(65) Prior Publication Data
US 2021/0328858 A1    Oct. 21, 2021

(51) Int. Cl.
*H04L 41/0668* (2022.01)
*H04L 61/5007* (2022.01)

(52) U.S. Cl.
CPC ...... *H04L 41/0668* (2013.01); *H04L 61/5007* (2022.05)

(58) Field of Classification Search
CPC ............. H04L 41/0668; H04L 41/0654; H04L 61/2007; H04L 61/20; H04L 41/0659;
(Continued)

(56) References Cited

U.S. PATENT DOCUMENTS 6,119,214 A * 9/2000 Dirks .................. G06F 12/0253
                                                    711/159
10,812,366 B1 * 10/2020 Berenberg .......... H04L 41/0806
(Continued)

FOREIGN PATENT DOCUMENTS

CN          109743261 A  *  5/2019
CN          110750332 A  *  2/2020
WO     WO-2020152503 A1  *  7/2020    ......... H04L 41/5012

OTHER PUBLICATIONS

Intel, Advanced Networking Features in Kubernetes* and Container Bare Metal, Dec. 2018, https://builders.intel.com/docs/networkbuilders/adv-network-features-in-kubernetes-app-note.pdf (Year: 2018).*
(Continued)

*Primary Examiner* — Hitesh Patel
*Assistant Examiner* — Vinh Nguyen
(74) *Attorney, Agent, or Firm* — Straub & Straub; Stephen T. Straub; Michael P. Straub

(57) ABSTRACT

The present invention relates to methods and apparatus for migrating and/or changing the allocation of network interface(s) or Internet Protocol address(es) of network interface(s) from one Pod, e.g., a failed Pod, to another Pod, e.g., a live Pod, in a Kubernetes system. An exemplary method of operating a Kubernetes system in accordance with an embodiment of the invention includes: establishing, by the Kubernetes system, a first service including a first Pod located on a first node and a second Pod located on a second node, allocating by the Kubernetes system an external network interface including an Internet Protocol address for use by the first Pod, the allocation of said external network interface for use by the first Pod being unknown to a first Kubelet managing the first node; and upon failure of the first Pod, changing allocation of the external network interface from the first Pod to the second Pod.

22 Claims, 9 Drawing Sheets

(58) Field of Classification Search
CPC . H04L 41/0695; H04L 61/5007; H04L 61/50; G06F 2009/45591; G06F 2009/45595; G06F 9/45558
See application file for complete search history.

(56) References Cited

U.S. PATENT DOCUMENTS

| | | | | |
|---|---|---|---|---|
| 11,025,483 | B1* | 6/2021 | Hashmi | H04L 63/0272 |
| 11,171,834 | B1* | 11/2021 | Bockelmann | G06F 9/44505 |
| 11,281,492 | B1* | 3/2022 | Rebeja | G06F 9/5077 |
| 2001/0009014 | A1* | 7/2001 | Savage | H04L 65/4046 |
| | | | | 709/204 |
| 2005/0286510 | A1* | 12/2005 | Nakajima | H04L 29/12066 |
| | | | | 370/386 |
| 2015/0381711 | A1* | 12/2015 | Singh | H04L 41/12 |
| | | | | 709/221 |
| 2017/0244593 | A1* | 8/2017 | Rangasamy | H04L 61/3015 |
| 2018/0048716 | A1* | 2/2018 | Madhayyan | H04L 61/2015 |
| 2018/0239678 | A1* | 8/2018 | Kusumoto | H04L 41/0668 |
| 2019/0306022 | A1* | 10/2019 | Shimoga Manjunatha | |
| | | | | H04L 41/0813 |
| 2020/0034254 | A1* | 1/2020 | Natanzon | G06F 11/2094 |
| 2020/0073692 | A1* | 3/2020 | Rao | H04L 41/0893 |
| 2020/0099961 | A1* | 3/2020 | Dice | H04N 21/64715 |
| 2020/0112487 | A1* | 4/2020 | Inamdar | H04L 41/082 |
| 2020/0403872 | A1* | 12/2020 | Shivashankara | H04L 41/0813 |
| 2021/0011816 | A1* | 1/2021 | Mitkar | G06F 9/45558 |

OTHER PUBLICATIONS

Kubernetes Documentation Concepts Section, available on the Internet on Dec. 29, 2019, 31 pages, posted on the Internet by Cloud Native Computing Foundation at https://kubernetes.io/docs/.

"What is Kubernetes", available on the Internet on Dec. 21, 2019, 5 pages, posted on the Internet at https://www.redhat.com/en/topics/containers/what-is-kubernetes.

* cited by examiner

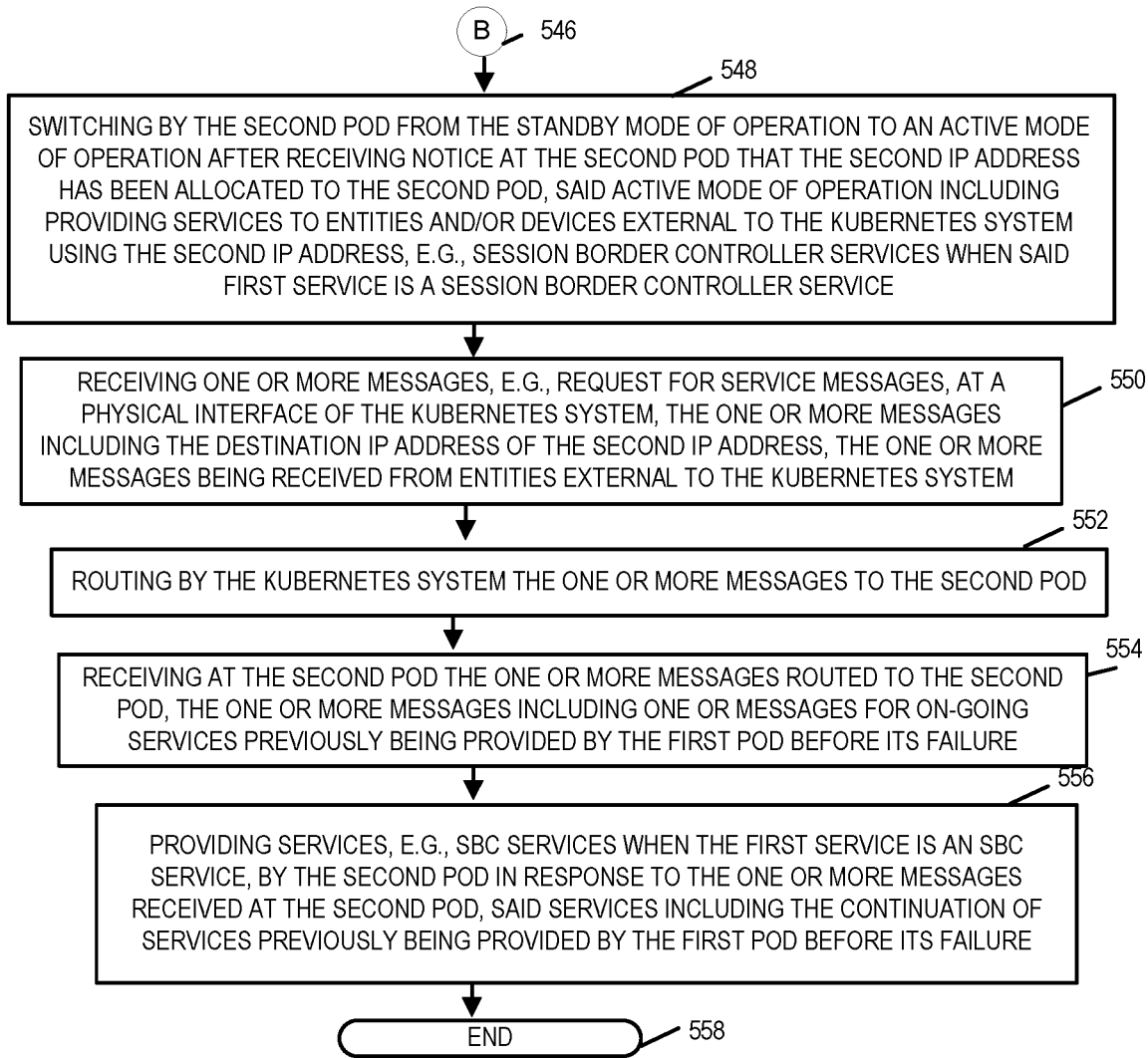

COMMUNICATIONS METHODS AND APPARATUS FOR MIGRATING A NETWORK INTERFACE AND/OR IP ADDRESS FROM ONE POD TO ANOTHER POD IN A KUBERNETES SYSTEM

FIELD OF INVENTION

The present invention relates to methods and apparatus for migrating and/or changing the allocation of network interface(s) or Internet Protocol address(es) of network interface(s) from one Pod to another Pod in a Kubernetes system, e.g., from a failed Pod on a first node to a live Pod on a second node.

BACKGROUND

Kubernetes is an open source project hosted by the Cloud Native Computing Foundation (CNCF). It provides an open source container orchestration engine for automating deployment, scaling, and management of containerized applications. The Kubernetes orchestration platform or system can be used to deploy or distribute applications sometimes referred to as workloads, e.g., session border controller applications or other program applications on nodes or hosts. The definition of various Kubernetes elements will now be discussed. Some of the definitions discussed herein have been taken or derived from information at the Kubernetes website https://kubernetes.io/docs/ and its glossary.

A cluster is a set of nodes or machines that run containerized applications managed by Kubernetes. A cluster has at least one worker node and at least one master node. The worker node(s) host the pods that are the components of the application. The master node(s) manages the worker nodes and the pods in the cluster.

A worker node may be a virtual machine (VM) or physical machine, depending on the cluster. It has local daemons or services necessary to run Pods and is managed by the control plane. The daemons on a node include kubelet, kube-proxy, and a container runtime implementing the Container Runtime Interface (CRI) such as Docker. Docker (specifically, Docker Engine) is a software technology providing operating-system-level virtualization also known as containers. A daemon being a program that runs continuously as a background process and exists for the purpose of handling periodic service requests that a computer system or node expects to receive.

A Pod is the basic execution unit of a Kubernetes application. It represents a single instance of an application in Kubernetes. A Pod encapsulates an application's container(s), storage resources, a unique network Internet Protocol (IP) address, and options which govern how the container(s) should execute. Each Pod runs a single instance of a given application. If you want to scale your application you use multiple Pods, one for each instance.

Pods support multiple cooperating containers (or processes) that form a cohesive unit of service. The containers in a Pod are co-located on the same physical or virtual machine in the cluster and share resources including networking and storage resources. Each Pod is assigned a unique IP address and every container in a Pod shares the network namespace, including the IP address and network ports. A Pod can specify a set of shared storage Volumes that are accessible to the containers in the Pod.

A container is a lightweight and portable executable image that contains software and all of its dependencies. Containers decouple applications from underlying host infrastructure to make deployment easier in different cloud or OS environments, and for easier scaling.

Container network interface (CNI) plugins are a type of Network plugin that adheres to the appc/CNI specification. The CNI plugin is selected by passing Kubelet the --network-plugin=cni command-line option. Kubelet reads a file from --cni-conf-dir (default/etc/cni/net.d) and uses the CNI configuration from that file to set up each pod's network. The CNI configuration file must match the CNI specification, and any required CNI plugins referenced by the configuration must be present in --cni-bin-dir (default/opt/cni/bin).

A kubelet is an agent that runs on each node in the cluster. It makes sure that containers are running in a pod. The kubelet takes a set of PodSpecs that are provided through various mechanisms and ensures that the containers described in those PodSpecs are running and healthy. The kubelet doesn't manage containers which were not created by Kubernetes.

A Kubernetes service is an abstract way to expose an application running on a set of Pods as a network service. The Service makes sure that network traffic can be directed to the current set of Pods for the workload.

Namespace is an abstraction used by Kubernetes to support multiple virtual clusters on the same physical cluster. Namespaces are used to organize objects in a cluster and provide a way to divide cluster resources. Names of resources need to be unique within a namespace, but not across namespaces.

As explained above each node has a Kubelet software agent running on it. The Kubelet is node management software that is responsible for ensuring that all workloads on the node are healthy and is responsible for starting, stopping, and maintaining application workloads (containers) are organized into Pods as directed by a control plane manager. A Pod being a group of one or more containers or workloads deployed to a single node. All containers in a Pod share an Internet Protocol (IP) address, InterProcess Communications (IPC), hostname, and other resources. When a workload is instantiated or a Pod is created during initialization on a node, the node's Kubelet, i.e., management software, invokes a container network interface (CNI) service to obtain network services for the Pod including the IP address. In Kubernetes, a Service is an abstraction which defines a logical set of Pods and a policy which defines how the set of Pods is accessed.

In Kubernetes, network interfaces for a Pod are created during initialization. There is no capability to add, remove, or change an existing network interface. There are use cases, where adding a new network interface based on Pod application logic after initialization is needed, e.g., the Standby instance for a real time session/communication service after detecting that the Active instance for the real time session/communication service is down, e.g., has experienced a software failure or crash. This use case requires that the Internet Protocol address used by the failed Active instance be migrated to the Standby instance for the real time session/communications service. Using a new Internet Protocol (IP) address in the Standby instance is not practical because it would require Session Initiation Protocol and Session Description Protocol negotiation of an existing session with the far end external entity. This would require several message exchanges introducing latency and may not even work for sessions both before and after failover.

For example, it may be determined that there is a need for five instances of session borders controllers and the Kubernetes orchestrates or decides which hosts of a cluster of hosts or nodes (e.g., 10 hosts or nodes) that the five session border controllers should be deployed or instantiated on. For example, SBC 1 may be deployed or implemented on the second node or host; SBC 2 may be deployed on the first node or host, SBC 3 may be deployed on the fifth node or host, SBC 4 may be deployed on the eighth node or host, and SBC 4 may be deployed on the tenth node or host. Each instance of an SBC being a Pod. That is each instance of an SBC being a set of containers or workloads that make up a SBC. Upon the instantiation and initialization of the SBC instance or Pod, the kubelet management software application for the node invokes the container network interface (CNI) service and establishes the IP address to be used by the SBC instance or Pod for communications. With respect to the SBC instances, the standard Kubernetes interface created by the kubelet management software application for the node does not meet the needs, i.e., does not satisfy the networking interface requirements of the SBC instance or Pod due to IP Address failover semantics needed for SBC (as elaborated further later in this document). For example, the standard Kubernetes networking interface for communicating with external entities from a Pod does not satisfy the requirements for an SBC instance or Pod. As a result the SBC instance or Pod will then directly call or invoke the container network interface (CNI) service application to obtain additional interfaces for communicating with external entities. The kubelet's management software for the node is unaware of the assignment of these additional interfaces to the SBC instance or Pod.

The standard interface created by the node's kubelet management software is cleaned up by the kubelet management software when the SBC instance or Pod fails or crashes and ceases to operate properly. The node's kubelet will both detect the Pod failure and perform the clean up of the standard interface by releasing it for reassignment. However, the node's kubelet management software is unaware of the additional interfaces assigned to the SBC or Pod in response to the direct call or invocation of the CNI service application. As a result, the node's kubelet management software cannot clean up these additional interfaces assigned to the SBC instance or Pod when the SBC instance or Pod fails or crashes and ceases to operate properly.

Furthermore, if the SBC instance or Pod that failed is an Active instance of a pair of active and standby SBC instances or Pods there is no way to migrate the Active SBC instance or Pod additional network interfaces which were independently obtained by the Active SBC instance or Pod by directly calling the CNI service application.

From the foregoing it is apparent that there is a need for a technological solution to how to effectively, efficiently and in a cost-efficient manner detect a failure of an Active Instance or Pod and migrate and/or change the allocation of network interface(s) and/or Internet Protocol (IP) address(es) of network interface(s) unknown to the kubelet management software of the Kubernetes node on which the Active instance or Pod has failed to a Standby instance or Pod on a different kuberenetes node.

While the above problems of how to clean up and migrate or change the allocation of an Active Pod's assigned network interfaces and/or IP addresses obtained after initialization and without knowledge of the node's kubelet management software to a Standby Pod has been explained in the context of a service with an Active SBC instance and a Standby SBC instance, the problem is not limited to a service of SBC instances but relates to any service with an Active Pod and Standby Pod.

SUMMARY

The present invention relates to methods and apparatus for migrating and/or changing the allocation of network interface(s) or Internet Protocol address(es) of network interface(s) from one Pod to another Pod in a Kubernetes system, e.g., from a failed Pod on a first node to a live Pod on a second node. The ability to migrate and/or change allocation of network interface(s) or Internet Protocol addresses(es) from one Pod to another Pod allowing for services to provided entities without interruption when a first Pod fails by having another Pod take over the IP address of the failed Pod. Various embodiments of the present invention solve one or more of the above described problems.

An exemplary method of operating a Kubernetes system in accordance with an embodiment of the invention includes: establishing, by the Kubernetes system, a first service including a first Pod located on a first node and a second Pod located on a second node, allocating by the Kubernetes system an external network interface including an Internet Protocol address for use by the first Pod, the allocation of said external network interface for use by the first Pod being unknown to a first Kubelet managing the first node; and upon failure of the first Pod, changing allocation of the external network interface from the first Pod to the second Pod. In some embodiments, the first Pod is an Active Pod and the second Pod is a Standby Pod, the Standby Pod changing from a standby mode of operation to an active mode of operation upon detection of the failure of the first Pod.

Another exemplary method of operating a Kubernetes system in accordance with an embodiment of the present invention includes the steps of: establishing, by the Kubernetes system, a first service, said first service including a first Pod and a second Pod, said first Pod being located on a first Kubernetes node of the Kubernetes system and said second Pod being located on a second Kubernetes node of the Kubernetes system, said establishing a first service including initializing said first Pod and initializing said second Pod; said initializing said first Pod including allocating by the Kubernetes system a first network interface of the Kubernetes system for use by the first Pod to communicate with entities within the Kubernetes system, said first network interface including a first Internet Protocol address, said allocation of the first network interface to the first Pod being known to a first Kubelet managing said first node; after initialization of said first Pod allocating by the Kubernetes system a second external network interface including a second Internet Protocol address for use by the first Pod, said allocation of said second external network interface for use by the first Pod being unknown to the first Kubelet managing said first node; upon failure of the first Pod, changing allocation of said second external network interface from said first Pod to said second Pod.

In some embodiments, when said first Pod is in an Active mode of operation, the first Pod provides services in response to requests received on the second network interface; and when said second Pod is in a Standby mode of operation, the second Pod does not provide services.

In some embodiments, the first service is a Session Border Controller service; and the first and second Pods of the first service provide Session Border Controller services when in an active mode of operation.

In some embodiments, the first and second Pods of the first service do not provide Session Border Controller services when in a standby mode of operation.

In some embodiments, the method further includes the step of determining that the first Pod of the first service is to operate in an active mode of operation and that the second Pod of the first service is to operate in a standby mode of operation.

In some embodiments, the method further includes the step of: operating the first Pod in an active mode of operation, said operating the first Pod in an active mode of operation including providing services to entities and devices external to the Kubernetes system using the second network interface.

In some embodiments, the method further includes the step of: operating the second Pod in a standby mode of operation, said operating the second Pod in a standby mode of operation including operating the second Pod to monitor the operation of the first Pod for a first condition, said first condition being indicative of a failure of the first Pod. In at least some of the embodiments, the condition being indicative of a failure of the first Pod includes one of the following: (i) a failure to receive at the second Pod from the first Pod heartbeat signals, or (ii) a failure to receive at the second Pod from the first Pod responses to health check messages communicated from the second Pod to the first Pod. In such embodiments, the first Pod has failed the first node on which the first Pod is located continues to operate.

In some embodiments, the method further includes that in response to the second Pod detecting the failure of the first Pod, a migration procedure is initiated to change the allocation of said second external network interface from said first Pod to said second Pod. In some embodiments, the migration procedure to change the allocation of said second external network interface from said first Pod to said second Pod includes: communicating from the second Pod a first request to delete or de-allocate the second external network interface from being allocated to the first Pod; and requesting by the second Pod that the second external network interface be allocated to the second Pod after receiving a confirmation at the second Pod that the second external network interface has been deleted or de-allocated from being allocated to the first Pod.

In some embodiments, the method further includes the step of switching by the second Pod from a standby mode of operation to an active mode of operation after receiving notice at the second Pod that the second external network interface has been allocated to the second Pod, said active mode of operation including providing services to entities and devices external to the Kubernetes system using the second network interface and prior to said migration of said second external network interface from said first Pod to said second Pod, messages received at said second external network interface Internet Protocol address from entities and devices external to said Kubernetes system are communicated to said first Pod; and after said migration of said second external network interface from said first Pod to said second Pod, messages received at said second external network interface Internet Protocol address from entities and devices external to said Kubernetes system are communicated to said second Pod.

In some embodiments, the first service is a Session Border Controller service; and the first Pod and said second Pod of the first service provide Session Border Controller services in response to requests when operating in an active mode of operation.

In some embodiments, the method further includes the steps of: establishing on said first node a first Interface Cleanup Service Pod; establishing on said second node a second Interface Cleanup Service Pod; and the step of communicating from the second Pod a first request to delete or de-allocate the second external network interface from being allocated to the first Pod includes communicating said request to delete or de-allocate the second external network interface from being allocated to the first Pod from the second Pod to the second Interface Cleanup Service Pod; and communicating, by the second Interface Cleanup Service Pod, a second request from the second Interface Cleanup Service Pod on the second node to the first Interface Cleanup Service Pod on the first node in response to receiving at the second Interface Cleanup Service Pod the first request to delete or de-allocate the second external network interface from being allocated to the first Pod, said second request being based on said first request and specifying the second external network interface to be deleted or de-allocated.

In some embodiments, the method further includes the step of invoking, by the first Interface Cleanup Service Pod, a first Container Network Interface Plug-in application executing on the first node to delete or de-allocate the second external network interface from being allocated to the first Pod in response to receiving by the first Interface Cleanup Service Pod the second request to delete or de-allocate the second external network interface from being allocated to the first Pod.

In some embodiments, the method further includes the steps of: communicating a first notification from the first Interface Cleanup Service Pod to the second Interface Cleanup Service Pod that the second external network interface has been deleted or de-allocated from being allocated to said first Pod; and communicating by the second Interface Cleanup Service Pod to the second Pod said confirmation that the second external network interface has been deleted or de-allocated from being allocated to the first Pod in response to receiving by the second Interface Cleanup Service Pod the first notification from the first Interface Cleanup Service Pod.

In some embodiments, the step of requesting that the second external network interface be allocated to the second Pod includes the second Pod invoking a second Container Network Interface Plug-in application executing on the second node to allocate the second external network interface to the second Pod.

In another exemplary method of operating a Kubernetes system in accordance with an embodiment of the present invention, the method includes the steps of: establishing, by the Kubernetes system, a first service, said first service including a first Pod and a second Pod, said first Pod being located on a first Kubernetes node of the Kubernetes system and said second Pod being located on a second Kubernetes node of the Kubernetes system, said establishing a first service including initializing said first Pod and initializing said second Pod; said initializing said first Pod including allocating by the Kubernetes system a first network interface of the Kubernetes system for use by the first Pod to communicate with entities within the Kubernetes system, said first network interface including a first Internet Protocol address, said allocation of the first network interface to the first Pod being known to a first Kubelet managing said first Kubernetes node; after initialization of said first Pod allocating by the Kubernetes system a second Internet Protocol (IP) address for use by the first Pod, said allocation of said second IP address for use by the first Pod being unknown to the first Kubelet managing said first Kubernetes node, said second IP address being for an external network interface; and upon failure of the first Pod, changing allocation of said second IP address from said first Pod to said second Pod.

The invention is also directed to systems and apparatus that are used to implement the various method embodiments of the invention. In some apparatus embodiments the Kubernetes nodes and each of the other apparatus/nodes/devices of the system include a processor and a memory, the memory including instructions which when executed by the processor control the apparatus/node/device of the system to operate to perform the steps of various method embodiments of the invention or functions ascribed to the various apparatus/node/device of the system.

An exemplary Kubernetes system in accordance with an embodiment of the present invention includes: one or more processors, said one or more processors controlling said Kubernetes system to: establish a first service, said first service including a first Pod and a second Pod, said first Pod being located on a first Kubernetes node of the Kubernetes system and said second Pod being located on a second Kubernetes node of the Kubernetes system, said establish a first service including initializing said first Pod and initializing said second Pod; said initializing said first Pod including allocating by the Kubernetes system a first network interface of the Kubernetes system for use by the first Pod to communicate with entities within the Kubernetes system, said first network interface including a first Internet Protocol address, said allocation of the first network interface to the first Pod being known to a first Kubelet managing said first node; allocate, after initialization of said first Pod, a second external network interface including a second Internet Protocol address for use by the first Pod, the allocation of said second external network interface for use by the first Pod being unknown to the first Kubelet managing said first node; and upon failure of the first Pod, change allocation of said second external network interface from said first Pod to said second Pod.

Another exemplary system embodiment in accordance with the present invention includes a Kubernetes system comprising: one or more processors, said one or more processors controlling said Kubernetes system to: establish a first service, said first service including a first Pod and a second Pod, said first Pod being located on a first Kubernetes node of the Kubernetes system and said second Pod being located on a second Kubernetes node of the Kubernetes system, said establish a first service including initializing said first Pod and initializing said second Pod; said initializing said first Pod including allocating by the Kubernetes system a first network interface of the Kubernetes system for use by the first Pod to communicate with entities within the Kubernetes system, said first network interface including a first Internet Protocol (IP) address, said allocation of the first network interface to the first Pod being known to a first Kubelet managing said first node; allocate, after initialization of said first Pod, a second IP address for use by the first Pod, the allocation of said second IP address for use by the first Pod being unknown to the first Kubelet managing said first node, the IP address being for an external network interface; and upon failure of the first Pod, change allocation of said second IP address from said first Pod to said second Pod.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 5 comprises FIGS. 5A, 5B, and 5C.

FIG. 5C illustrates a third part of a flowchart of an exemplary method in accordance with an embodiment of the present invention.

DETAILED DESCRIPTION

Figure 1:
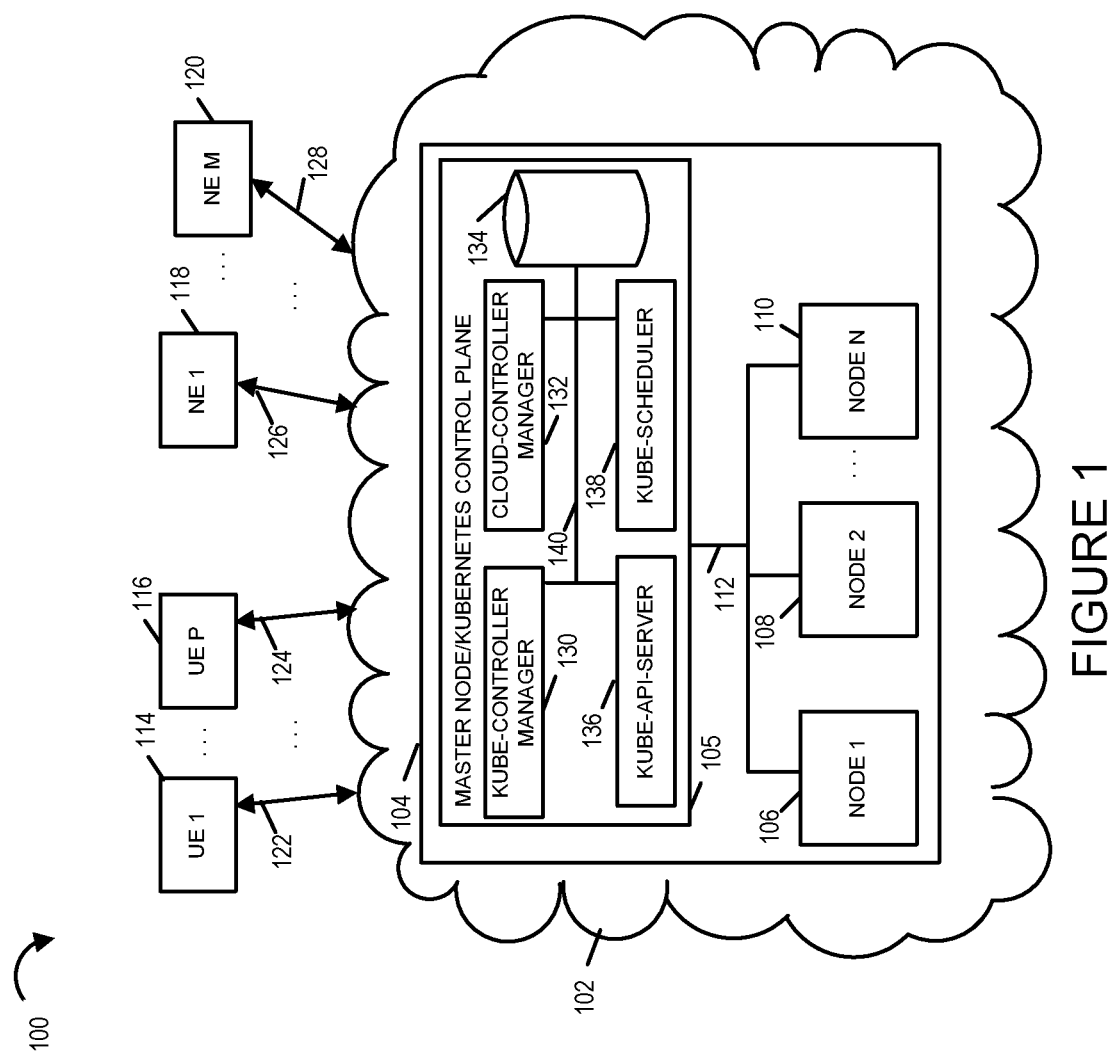
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a cloud network 102, a plurality of user equipment devices (UE 1 114, . . . , UE P 116, where P is an integer greater than 1), a plurality of network equipment devices (NE 1 118, . . . , NE M 120, where M is an integer greater than 1), and a plurality of communications links 122, . . . , 124, 126, . . . , 128. The cloud network 102 includes a Kubernetes system 104 including a Kubernetes master node/control plane 105, a plurality of kubernetes worker nodes (node 1 106, node 2 108, . . . , node N, where N is an integer greater than 2 and communications link 112 which couples and/or connects the Kubernetes master node/control plane and the plurality of worker nodes to each other so that the Kubernetes master node/control plane and the worker nodes can communicate with one another and exchange messages, requests, commands, data, and/or information. The communications links may be cables, wires and/or wireless links or a combination of cables, wires and wireless links. Exemplary user equipment devices are real-time communications devices such as for example, phones, cell phones, smartphones, computers, laptops, Internet Protocol telephones, and tablets. Exemplary network equipment devices include session border controllers, gateways, base stations and network switches. The communications links 122, . . . , 124 couple and/or connect user equipment devices UE 1 114, . . . , UE P 116 to the cloud network 102 respectively. The communications links 126, . . . , 128 couple and/or connect the network equipment devices NE 1 118, . . . , NE M 120 to the cloud network 102 respectively. The communications links 126, . . . , 128 are typically wired or fiber optic cables. The cloud network 104 is a communication network that includes a plurality of links that interconnect and/or couple the devices and systems of the cloud network to one another. Communications link 112 couples and/or connects the nodes (master node/control plane 105, worker node 1 106, worker node 2 108, . . . , worker node N 110 of the Kubernetes system 104 to each other. The communications link 112 is typically a cable or wired communications link. While a single communications link 112 is shown for sake of simplicity in explaining the invention it should be understand that a plurality of links may be, and in some embodiments are, used to connect the plurality of worker nodes in the Kubernetes system 104. The kubernetes master node 105, worker node 1 106, worker node 2 108, . . . , worker node N 110 may be, and in some embodiments are, compute nodes. Each compute node including a processor and memory, the memory including instructions, e.g., software instructions, which when executed by the processor controls the node to perform one or more functions, operations or steps described in the methods described herein. In some embodiments, the software instructions when executed may create a virtual machine upon which virtual applications or devices are implemented such as for example a virtual Session Border Controller.

The Kubernetes system 104 includes a cluster including a set of worker nodes or computing devices, e.g., nodea or devices which include one or more processors, that run containerized applications. The worker nodes host Pods that are the components of the application workload. The Kubernetes master node/control plane 105 manages the worker nodes and the Pods hosted on the worker nodes. The Kubernetes master node/control plane 105 in this exemplary embodiment includes the following components: a Kube-Controller Manager 130, a Cloud-Controller Manager 132, an etcd database 134, a Kube-API-Server 136, a Kube-Scheduler 138 and a communications link 140 over which the components of the master node/control plane 105 communicate and/or exchange data and information. A brief description of the master node/control plane 105 components will now be presented. The data for the system is stored in the database 134. The Kube-Scheduler 138 selects a worker node for newly created Pods to run on. The Kube-Controller-Manager 130 runs the controller processes which include, among other things, a node controller, a replication controller, and an endpoint controller. The Cloud-Controller-Manager 132 runs controllers that interact with the underlying cloud providers software/code. The Kube-API-Server 136 exposes the Application Programming Interface (API) for the master node/control plane 105. While the control plane components 105 can be run on any machine in the cluster in this exemplary system they are placed on the same machine or master node and that machine or master node is not running any user containers. Each individual non-master node also referred to as a worker node, e.g., worker node 1 106, worker node 2 108, . . . , worker node N 110 runs two processes: (i) a Kubelet which communicates with the Kubernetes master node/control plane 105, and (ii) a Kube-proxy which is a network proxy which reflects Kubernetes networking services on each node.

FIG. 200 illustrates further details of the kubernetes worker node 1 106 and kubernetes worker node 2 108. In the exemplary system 100, kubernetes worker node 1 106 includes an Active Instance 202, e.g., an Active Session Border Controller Pod 202 which includes a set of containers or workloads that collectively form a software application that provides session border controller services, a plurality of interface cleanup service Pods (Interface Cleanup Service Pod 1 204, . . . , Interface Cleanup Service Pod X 205) which provides interface management services in response to Pod requests for network interfaces unknown to the kubelet 209, i.e., interfaces which are not visible to the kubelet 209, a Container Network Interface (CNI) service Plug-in 206 which includes, among other things, a CNI Add Application Programming Interface (API) 207 and a CNI Delete API 208, a kubelet 209 which is a software node management application, a Kube-proxy 210 which is a network proxy which reflects services as defined in the Kubernetes API on each node and can do simple TCP, UDP, and SCTP stream forwarding or round robin TCP, UDP, and SCTP forwarding across a set of backends, and a CNI Plug-in Daemon 211 which provides network connectivity between nodes and which monitor's the health or status of other nodes and Pods on the node on which it is executing and upon detection of a failed Pod will take corrective action e.g., to delete the failed Pod. In some embodiments the CNI service Plug-in 206 is a native Kubernetes application which is part of the operating system executing on the processor of the node 1 106.

CNI Plug-in service 206 adds network interfaces in response to requests made via the CNI Add API 207. The Kubelet 209 calls or invokes CNI Add API 208 during Pod initialization, e.g., during initialization of Pod 202. After initialization a Pod, e.g., Active SBC Pod 202, may also directly request an additional network interface by invoking or calling the CNI service 206 via the CNI Add API exposed by the CNI service Plug-in 206.

Similarly, the CNI service 206 deletes network interfaces in response to requests made via the CNI Delete API 208 of the CNI Plug-in service 206. When a Pod directly calls or invokes the CNI Add API or CNI delete API of the CNI Plug-in independently of the Kubelet of the node, e.g., Kubelet 209 of node 106, the Kubelet is unaware of the resulting service provided, e.g., a network interface assigned to the Pod or a network interface assignment for the Pod being deleted. The CNI Plug-in Daemon 211 runs continuously and checks on the node 106's health including whether any Pods on the node 106 have failed.

The CNI Plug-in Daemon 211 as mentioned above provides network connectivity between nodes, e.g., between node 106 and node 108. When a Pod, e.g., Active SBC Pod 202, on a node, e.g., node 106, fails but the node, e.g., node 106, on which the Pod is located remains operational, the kubelet, e.g., Kubelet 209 of the node, e.g., node 106, calls or invokes the CNI Delete API, e.g., CNI Delete 208, for the failed Pod, e.g., Active SBC Pod 202, so that the network interface it added during initialization is cleaned up. As part of this clean up process, the CNI Plug-in Daemon, e.g., CNI Plug-in Daemon 211, on that node, e.g., node 106, informs other CNI Plug-in Daemons on other nodes, e.g., CNI Plug-in Daemon 221 on node 108 so that inter-node network connectivity is updated properly. The Kubelet, e.g., Kubelet 209, of the node, e.g., 106 on which the Pod, e.g., Active SBC Pod 202, failed however is not aware of the additional network interfaces added by a Pod after initatialize when the Pod directly calls or invokes the CNI Add API independent of the Kubelet, e.g., Kubelet 209. In accordance with an embodiment of the invention, the Standby SBC Pod 212, monitors the health of the Active SBC Pod 202 and upon detection of a failure, e.g., failure to receive heartbeat messages, invokes an interface cleanup service Pod on node 108, e.g., Interface Cleanup Service Pod 1 214, to request an interface cleanup service Pod on the node 106, e.g., Interface Cleanup Service Pod 1 204, to cleanup the network interfaces assigned to the failed Active SBC Pod 202. To do this, the interface cleanup service pod, e.g., Interface Cleanup Service Pod 204, on the node, e.g., 106, with the failed Pod, e.g., Active SBC Pod 202, invokes or calls the CNI Delete API 207.

When the node fails, e.g., node 106, the Kubelet, e.g., Kubelet 209, the CNI Plug-in service 206 and the CNI Plug-in Daemon 211 will no longer function as these entities will cease to exist. In such a case when the node, e.g., node 106 fails, the CNI plug-in Daemons on other nodes, e.g., CNI Plug-in Daemon 221 of node 108, will detect the failure of the node and update inter-node network connectivity properly. In some embodiments, the failure of the CNI Plug-in Daemon 221 of node 108, may detect the failure of health check message from CNI Plug-in Daemon 211 of node 106 and thereby detect that node 106 has failed upon which the CNI Plug-in Daemon 221 will update its inter-node network connectivity with respect to the failed node 106.

In the exemplary system 100, kubernetes worker node 2 108 includes a Standby Instance 212, e.g., a Standby Session Border Controller Pod 212 which includes a set of containers or workloads that collectively form a software application that provides session border controller services when activated, a plurality of interface cleanup service Pods (Interface Cleanup Service Pod 1 214, . . . , Interface Cleanup Service Pod X 215) which provides interface management services in response to Pod requests for network interfaces unknown to kubelet 219, i.e., interfaces which are not visible to the kubelet 219, a CNI service Plugin 216 which includes, among other things, a CNI Add API 217 and a CNI Delete API 218, a kubelet 219 which is a software node management application, a Kube-proxy 220 which is a network proxy which reflects services as defined in the Kubernetes API on each node and can do simple TCP, UDP, and SCTP stream forwarding or round robin TCP, UDP, and SCTP forwarding across a set of backends, and a CNI Plug-in Daemon 221 which provides network connectivity between nodes and which monitor's the health or status of other nodes and Pods on the node upon which it is executing and upon detection of a failed Pod will take corrective action e.g., to delete the failed Pod. CNI service 216 adds network interfaces in response to requests made via the CNI Add API 217. For example, a Pod may directly request an additional network interface by invoking or calling the CNI service 216 via the CNI Add API 217 exposed by the CNI service Plugin 216. Similarly, the CNI service 216 deletes network in response to requests made via the CNI Delete API 218. The CNI Plug-In Daemon 221 runs continuously and checks on other nodes health as well as whether any Pods on the node on which it is executing have failed.

In some embodiments, the CNI Plug-in application exposes/handles both the CNI ADD API/CNI DELETE APIs. These APIs are called to add/delete network interfaces. The Kubelet calls CNI ADD during Pod initialization and CNI DELETE when Pod terminates. Application running on a Pod also calls them for network interfaces, which it adds/deletes independent of the Kubernetes system standard components, e.g., independent of the Kubelet managing the node. A Kubernetes node corresponds to a host (physical or virtual). There is a single Kubelet and CNI plug-in application on each worker node. On each node, there is also a CNI Plug-in Daemon. The CNI Plug-in Daemon provides network connectivity between nodes. When a Pod fails, but the node on which the Pod is located does not fail that is it remains operational, the Kubelet on that node calls or invokes the CNI DELETE API for that Pod so that network interface it added during initialization is cleaned up. As part of this process, CNI Plug-in Daemon on that node informs other Plug-in Daemons on other nodes of the system so that inter-node network connectivity is updated properly. When the node fails, the Kubelet and CNI entities on that node are also down. They cease to exist. In such a case, CNI plug-in Daemons on other nodes of the system detect the node's failure, e.g. they don't receive health-check messages from the CNI plug-in daemon on the failed node, and CNI plug-in Daemons on the other nodes update inter-node network connectivity properly to reflect the failed node status. For interfaces added by an application executing on a Pod independent of the Kubernetes system, the CNI DELETE API needs to be called when the Pod has failed or is down but the node remains operational. This is similar to the Kubelet calling CNI DELETE for the network interface it created during Pod initialization and this operation is achieved through the use of a request to an Internet Cleanup Service Pod located on the failed node as discussed in connection with the methods and signaling diagrams discussed in the specification.

In some embodiments, the invocation of a request for an additional interface, for example a CNI ADD request is an API call via the CNI ADD API. The request, invocation or call including the IP Address of the interface being a parameter of this API call. Similarly, in some embodiments, the invocation of a request to delete an interface, for example a CNI DEL request is an API call via the CNI DEL API. The request, invocation or call including the IP Address of the interface to be deleted.

The CNI ADD API request/call also has other parameters beyond the IP address. Some of the pertinent parameters are discussed/shown in the context of the following exemplary CNI ADD request/call: CNI ADD (network interface name, IP Address, container-id, network namespace path). The network interface name parameter is the name of the desired network interface, e.g. net0. The IP Address parameter is IP Address to be bound for the network interface, e.g. 172.192.156.32. The container-id parameter is the container-id of the Pod making the CNI ADD request, e.g. 571c3a115fcf. The network namespace path parameter is the path to the network namespace to be added, i.e. /proc/[pid]/ns/net or a bind-mount/link to it.

With respect to the IP address the CNI ADD (IP-X, . . . ) request/call is a request that the Pod making the request wants a network interface to be created with the address being IP-X. The IP Address to use for the interface is determined by the Pod. The Pod has the information for the interface request, e.g., the IP address to request, through configuration and/or by getting it from another entity of the Kubernetes system such as for example an IP Address Allocation Manager. Some of the pertinent parameters of CNI DEL request/call are discussed/shown in the context of the following exemplary CNI DEL request/call: CNI DEL (network interface name, container-id, network namespace path). The network interface name parameter is name of the network interface to be deleted, e.g. net0. The container-id parameter is the container-id of the Pod making the CNI DEL request, e.g. 571c3a115fcf. The network namespace path is the path to the network namespace to be deleted, i.e. /proc/[pid]/ns/net or a bind-mount/link to it.

When there is an interface with IP-X, a new CNI ADD (IP-X, . . . ) should not be called as it would create confusion in terms of IP packet routing, which is handled by CNI plug-in daemon. Prior to adding the interface with the IP-X address using the CNI ADD (IP-X, ... ) call/request, the CNI DEL needs to be called, e.g., CNI DEL (IP-X, ... ). The Interface Cleanup Service Pod on the node with the failed Pod to which the interface with the IP-X address is allocated makes this CNI DEL call/request in various embodiments of the invention.

In Kubernetes, a Service is an abstraction which defines a logical set of Pods and a policy which defines how the set of Pods is accessed. In the present example, the Kubernetes service includes an Active Pod and a Standby Pod.

The Active Pod is an active instance of a Service, e.g., an SBC service, which requires network access to external entities. The Standby Pod is a standby instance of the Service, e.g., an SBC service, which requires network access to external entities. The Interface Cleanup Service Pod provides interface management services in response to Pod requests for network interfaces unknown to the kubelet of the node as previously explained. With respect to interfaces, in this example we will describe three types of interfaces. The first is referred to as eth0 and is the standard container interface known to/used by Kubernetes which is utilized for Pod/Kubernetes communications and low volume Pod/Pod communication. This first interface eth0 is known/visible to the kubelet of the node. The second interface is referred to as net0 and is an interface used when communicating with external entities, e.g., media interfaces, signaling port interfaces. This second interface is unknown/not visible to the kubelet as it is obtained by the Active Pod, e.g., Active SBC Pod, from an invocation or request sent to the container network interface service application or routine. The third interface is referred to as net-1 and is an interface used for high volume Pod/Pod communication, e.g., between a first IP-Interface Service (SBC service) and a second IP-Interface Service (gateway service) for relaying media/signaling IP packets. While three network interfaces have been described for each Pod, each Pod may have multiple network interfaces for example in addition to net-0 the Pod may have net-2, net-3, net-4 which are separate network interfaces also used for communicating with external entities, e.g., user equipment devices or network equipment devices.

Each service offered, e.g., SBC service, gateway service, transcoding service, etc., will have two instances. The first instance being an Active Instance and the second instance being a Standby Instance. In the exemplary embodiment, the service is a Session Border Controller service with an Active Session Border Controller Pod and a Standby Session Border Controller Pod. The service instances coordinate among each other on instantiation and determine which Pod will be placed in active mode of operation and which will be placed in standby mode of operation. In some embodiments this is done through an election process. The two different instances, i.e., the Active Instance and the Standby Instance, are located on two separate nodes so that they will not be affected by a hardware failure which occurs at a single node. A first namespace is designated and used to define the workspace or environment on the first node that contains the Active Instance of the service and associated resources. A second namespace is designated and used to define the workspace or environment on the second node that contains the Standby Instance of the service and associated resources.

The Kubernetes system management is not involved in selecting which instance of the service will be the Active instance or Active Pod of the service and which instance will be the Standby instance or Standby Pod of the service.

Figure 3:
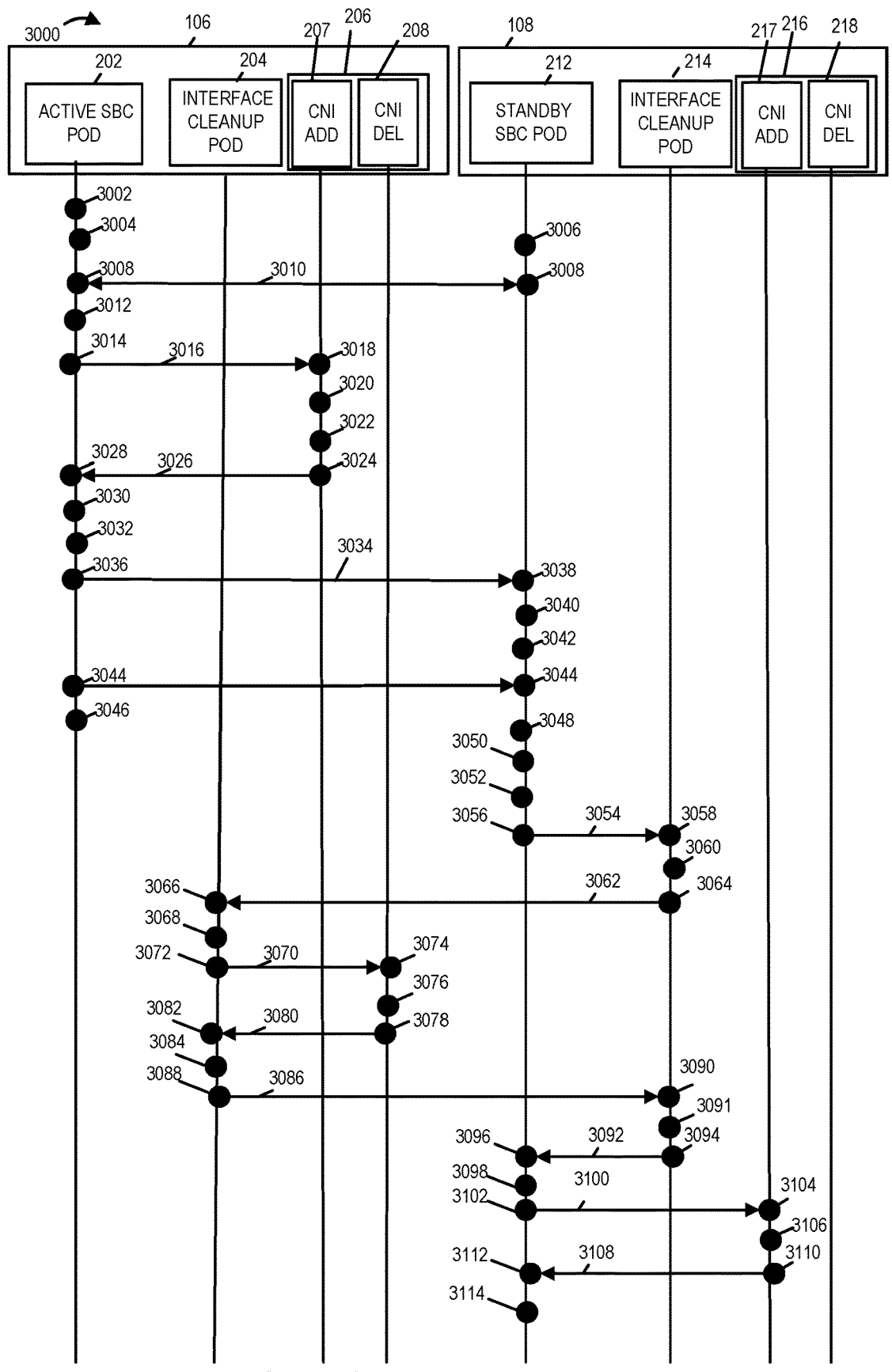
FIG. 3 illustrates an exemplary method and associated signaling in accordance with an exemplary embodiment of the present invention.

FIG. 3 illustrates a signaling diagram 3000 which illustrates steps of an exemplary method embodiment of the present invention and exemplary high level signaling between the elements. While it is to be understood that additional signaling and steps are typically required for communications among elements, the signaling diagram/method 3000 illustrates the steps pertinent to explaining the exemplary embodiment of the invention. Elements or steps with the same reference numbers used in different figures are the same or similar and those elements or steps will not be described in detail again. The signaling diagram/method 3000 is explained in connection with the system 100 of FIG. 1.

The method 3000 starts in step 3002. Operation proceeds from step 3002 to steps 3004 and 3006. In step 3004, the SBC Pod 202 is instantiated or created at which time the standard interface SBC Pod 202 eth0 is setup through the CNI Plug-in service 206 via CNI Add API 207 by the kubelet 209 for the SBC Pod 202. In this example the namespace in which the SBC Pod 202 is implemented will be referred to as namespace: workspace-A. In step 3006, the SBC Pod 212 is instantiated or created at which time the standard interface SBC Pod 212 eth0 is setup through the CNI Plug-in service 216 via CNI Add API 207 by the kubelet 219 for the SBC Pod 212. In this example the namespace in which the SBC Pod 202 is implemented on node 2 will be referred to as namespace: workspace-B. Operation proceeds from step 3004 and 3006 to step 3008.

In step 3008, a leader election or coordination operation or process is undertaken to determine which of the Pods 202 and 212 will undertake which modes of operation Active mode or Standby mode. Messages 310 are exchanged between Pods 202 and 212 as part of this leader election or coordination operation. In this example, the SBC Pod 202 is elected or selected to be the leader, i.e., the SBC Pod 202 is to be the Active SBC Pod which will be placed in an active mode of operation handling incoming requests for services while the SBC Pod 212 is determined or selected to be the Standby SBC Pod which will operate in a standby mode of operation monitoring for a failure of the Active SBC Pod and taking over providing SBC services upon detection of a failure. Operation proceeds from step 3008 to step 3012.

In step 3012, the Active SBC Pod 202 generates a request message 3016 for an additional network interfaces for the SBC Active Pod 202 within the namespace: workspace-1 (e.g., IP address and/or ports for the Active SBC Pod 202) to use for communications, e.g., a network interface that can be used for communicating with external entities such as UE 1 114 or NE 1 118 which are external to the Kubernetes system 104. While in the example, a single additional network interface is requested multiple network interfaces, may be and in some embodiments are requested. Each request for an additional network interface would be a separate request including the IP address for the interface to be added which is communicated to the CNI Plug-in Service 206 via the CNI Add API 207. The Pod is aware of which IP address it needs to use through the Pod's configuration or via requesting the information of a configuration manager.

Operation proceeds from step 3012 to step 3014. In step 3014 the SBC Pod 202 communicates the request message 3016 to CNI Plug-in Service 206 via CNI Add API 207. Operation proceeds from step 3014 to step 3018.

In step 3018, the CNI Plug-in service 206 receives the request message 3016 via the CNI Add API 207. Operation proceeds from step 3018 to step 3020.

In step 3020, the CNI Plug-in 206 assigns or allocates an additional network interface to the Active SBC Pod 202 for use in communicating with other entities for example entities external to the Kubernetes system 104. This additional network interface, e.g., IP address and port number, is unknown to the kubelet 209 which is managing the standard kubernetes network interface for all Pods in the node 1 106. The additional network interface is not visible to the kubelet 209, i.e., the kubelet 209 is unaware that namespace: workspace-1 in which Active SBC Pod 202 is implemented has an additional network interface that has been assigned for use by Active SBC Pod 202. In this example, the additional network interface which is assigned to the Active SBC Pod 202 by the CNI Plug-in service 206 in the Node ID: Node 1, namespace: workspace-1 has the network interface name net-0, with IP address/port number equal IP-1, port-1. Operation proceeds from step 3020 to step 3022.

In step 3022, the CNI Plug-in service 206 generates response message 3026 which includes the requested additional network interface identification information, e.g., namespace, network interface name and IP address/port assigned/allocated to the Active SBC Pod 202. Operation proceeds from step 3022 to step 3024.

In step 3024, the CNI Plug-in service 206 via CNI Add API 207 communicates the generated message 3026 to the Active SBC Pod 202 in response to the request message 3016. Operation proceeds from step 3024 to step 3028.

In step 3028, the Active SBC Pod 202 receives the response message 3026 from the CNI Add plugin 207. Operation proceeds from step 3028 to step 3030.

In step 3030, the Active SBC Pod 202 stores in memory the information received in the response message 3026 about the additional network interface assigned for the Active SBC Pod 202's use including for example, the Node Id: Node 1, namespace: workspace-1, network interface name: net-0, IP address/port number: IP-1, port 1. Operation proceeds from step 3030 to step 3032.

In step 3032, the Active SBC Pod 202 generates message 3034 which includes identification information about the additional network interface assigned to the Active SBC Pod 202 including the Node-Id, namespace, network interface name, and IP address/port number which in this example are Node Id: Node 1, namespace: workspace-1, network interface name: net-0, IP address/port number: IP-1, port 1. Operation proceeds from step 3032 to step 3036.

In step 3036, the Active SBC Pod 202 communicates the message 3034 to the Standby SBC Pod 212. Operation proceeds from step 3036 to step 3038.

In step 3038, the Standby SBC Pod 212 receives the message 3034. Operation proceeds from step 3038 to step 3040.

In step 3040, the Standby SBC Pod 212 processes the message 3034 and stores the Active SBC Pod 202's additional network interface identification information in memory at the Standby SBC Pod 212 including the Node Id: Node 1, namespace: workspace-1, network interface name: net-0, IP address/port number: IP-1, port 1 information. Operation proceeds from step 3040 to step 3042.

In step 3042, the Standby SBC Pod 212 begins monitoring the Active SBC Pod 202 for an indication of a failure condition. For example, in some embodiments the Active SBC 202 communicates heartbeat pulse messages to the Standby SBC 212 at regular intervals and when the Standby SBC Pod 212 does not receive any heartbeat pulse messages over several interval periods, the Standby SBC Pod 212 makes a determination that the Active SBC Pod 212 has failed. The indication of a failure that the Standby SBC Pod 212 detects in such cases is the failure to receive heartbeat pulse messages from the Active SBC Pod 202 over a first period of time, the first period of time being greater than a threshold number of intervals during which the heartbeat pulse should have been received if the Active SBC Pod 202 were properly functioning. In another example, the monitoring step by Standby SBC Pod 212 includes the SBC Pod 212 sending probe messages to the Active SBC Pod 202 on a periodic basis, e.g., every second, and monitoring for a response from the Active SBC Pod 202 to the probe messages. An indication of a failure condition at the Active SBC Pod 202 includes not receiving at the Standby SBC Pod 212 a response to a plurality of probe messages sent to the Active SBC Pod 202 over a first period of time such as for example 10 seconds.

In step 3044, Active SBC Pod 202 begins sending heartbeat signals to the Standby Pod 212 or sending responses to probe messages, e.g., health check probe messages, from the Standby Pod 212. The Standby SBC Pod 212 receives the messages from the Active SBC Pod 202 as part of its monitoring of the Active SBC Pod 202 operations. Operation proceeds from step 3044 to step 3046.

In step 3046, the Active SBC Pod 202 begins providing session border controller services in response to requests from user devices and/or network equipment devices, e.g., U1 114, NE 1 118. Operation proceeds from step 3046 to step 3048.

In step 3048, the Standby SBC Pod 212 detects a condition indicative of the failure of the Active SBC Pod 202, e.g., the Standby SBC Pod 212 does not receive heartbeat messages or responses to probe messages during a predetermined amount of time from the Active SBC Pod 202. Operation proceeds from step 3048 to step 3050.

In step 3050, the Standby SBC Pod 212 determines that the Active SBC Pod 202 has failed based on the detection of the condition indicative of the failure at the Active SBC Pod 202. Operation proceeds from step 3050 to step 3052.

In step 3052, upon determining that the Active SBC Pod 202 has failed, the Standby SBC Pod 212 generates a delete interface message 3054 requesting the deletion of the additional interface(s) assigned or allocated to the Active SBC Pod on Node 1. The message 3056 includes the Node Id: Node 1, namespace: workspace-1, and network interface name: net-0 which had been provided to the Standby SBC Pod 212 in message 3034. The Standby SBC Pod 212, in some embodiments, retrieves this information from the memory on Node 2 in namespace: workspace-2 in which it had previously been stored. Operation proceeds from step 3052 to step 3056.

In step 3056, the Standby SBC Pod 212 communicates the delete interface message 3054 to one of the plurality of Interface Cleanup Service Pod 1 214, . . . , Interface Cleanup Service Pod X 215 located at the Node 2 108. In this example, the Standby SBC Pod 212 communicates the delete interface message 3054 to the Interface Cleanup Service Pod 1 214 also referred to herein as Interface Cleanup Pod 214. Operation proceeds from step 3056 to step 3058.

In step 3058, the Interface Cleanup Pod 214 receives the delete interface message 3054. Operation proceeds from step 3058 to step 3060.

In step 3060, the Interface Cleanup Pod 214 processes the delete interface message 3054 including: (i) determining the node on which the interface cleanup is to be performed from the contents of the message 3054 and (ii) generating a delete interface message 3062 based on the delete interface message 3054. For example, the delete interface message 3062 includes the Node Id, namespace and network interface name(s) of the network interface(s) to be deleted. In this case that is Node Id: Node 1, namespace: workspace-1, and network interface name: net-0. If the Active SBC Pod also had additional network interfaces assigned then those network interface names would also be included such as for example, net-2, net-3, and net-4. The operations of determining the node on which the interface cleanup is to be performed and the generating of the delete interface message 3062 may be, and in some embodiments are, separate steps. Operation proceeds from step 3060 to step 3064.

In step 3064, the Interface Cleanup Pod 214 communicates the delete interface message 3062 to one of the Interface Cleanup Service Pods 1 to X located at Node 1. In this example, the Interface Cleanup Pod 214 communicates the delete interface message 3062 to the Interface Cleanup Service Pod 1 204 also referred to herein as Interface Cleanup Pod 204 located at the Node 1 106. Operation proceeds from step 3064 to step 3066.

In step 3066, the Interface Cleanup Pod 204 receives the delete interface message 3062. Operation proceeds from step 3066 to optional step 3068.

In step 3068, the Interface Cleanup Pod 204 processes the received delete interface message 3062 and generates a request message 3070 based on the received delete interface message 3062 to delete the interface at node 1 having the namespace and network interface identified in the received delete interface message 3062. In some embodiments the message 3070 includes the Node Id and namespace for the interface to be deleted, e.g., Node Id: Node 1, namespace: net-0. In some other embodiments, the message 3070 includes the Node Id, namespace and network interface name for the interface to be deleted. When multiple network interfaces are to be deleted, separate request messages are generated for each network interface to be sent to the CNI Plug-in service 206 via the CNI Delete API 208 with each separate request including at least the namespace and network interface name of the network interface to be deleted. Operation proceeds from step 3068 to step 3072.

In step 3072, the Interface Cleanup Pod 204 communicates the request message 3070 to CNI Plug-in service 206 via CNI Delete API 208 in node 1 106. Operation proceeds from step 3072 to step 3074.

In step 3074, the CNI Plug-in service 206 via CNI Delete API 208 receives the request message 3070. Operation proceeds from step 3074 to step 3076.

In step 3076, the CNI Plug-in service 206 processes the received request message 3070 and deletes the network interface identified in the request message 3070 which in this example is interface identified as Node Id: Node 1, namespace: workspace-1, network interface name: net-0. Operation proceeds from step 3076 to step 3078.

In step 3078, the CNI Plug-in service 206 via CNI Delete API 208 generates and communicates message 3080 to Interface Cleanup Pod 204. The message 3080 confirms the deletion of the requested network interface having Node Id: Node 1, namespace: workspace-1, network interface name net-0. Operation proceeds from step 3078 to step 3082.

In step 3082, the Interface Cleanup Pod 204 receives and processes the message 3080. Operation proceeds from step 3082 to step 3084.

In step 3084, the Interface Cleanup Pod 204 generates Interface deleted message 3086 which contains a confirmation that network interface having Node Id: Node 1, namespace: workspace-1, network interface name net-0 has been deleted as requested in interface deletion request message 3062. Operation proceeds from step 3084 to step 3088.

In step 3088, the Interface Cleanup POD 204 communicates the interface deleted message 3086 to the Interface Cleanup POD 214 located in Node 2 108. Operation proceeds from step 3088 to step 3090.

In step 3090, the Interface Cleanup Pod 214 receives the interface deleted message 3086 from the Interface Cleanup Pod 204. Operation proceeds from step 3090 to step 3091.

In step 3091, the Interface Cleanup Pod 214 processes the deleted message 3086 and determines that the request to delete the interface with Node Id: Node 1, namespace: workspace-1 and network interface name: net-0 has been completed. Upon determining that the interface was deleted as requested the Interface Cleanup Pod 214 generates message 3092 which includes a confirmation that the requested interface has been deleted. Operation proceeds from step 3091 to step 3094.

In step 3094, the Cleanup Interface Pod 214 communicates the interface deleted message 3092 to the Standby SBC Pod 212 in response to the request message 3054. Operation proceeds from step 3094 to step 3096.

In step 3096, the Standby SBC Pod 212, receives the interface deleted message 3092. Operation proceeds from step 3096 to step 3098.

In step 3098, the Standby SBC Pod 212 processes the received interface deleted message 3092 confirming that the interface with Node Id: Node 1, namespace: workspace-1, and network interface net-0 which was being used by the failed Active SBC Pod 202 has been deleted. In response to determining that the interface with Node Id: Node 1, namespace: workspace-1, and network interface name: net-0 which was being used by the failed Active SBC POD 202 has been deleted, the Standby SBC Pod 212 generates message 3100 which requests the IP address and port number: IP-1, port 1 previously used by the failed Active SBC Pod 202 be assigned, allocated or migrated to the Standby SBC Pod 212. Operation proceeds from step 3098 to step 3102.

In step 3102, the Standby SBC Pod 212 communicates the message 3100 to via the CNI Add API 217 to the CNI Plug-in service 216 requesting that the network interface IP address and port number IP-1, port 1 previously used by the failed Active SBC Pod 202 be assigned, allocated or migrated to the Standby SBC Pod 212 for the Standby SBC Pod 212's use so that the Standby SBC Pod 212 can take over the servicing of requests from the failed Active SBC Pod 202. Operation proceeds from step 3102 to step 3104.

In step 3104, the CNI Plug-in service 216 receives via the CNI Add API 217 the request message 3100. Operation proceeds from step 3104 to step 3106.

In step 3106, the CNI Plug-in service 216 processes the request message 3100 and assigns, allocates or migrates the network interface having IP address and port: IP-1, port 1 which was previously being used by the failed Active SBC Pod 202 to the Standby SBC Pod 212. That is the IP address/port: IP-1, port 1 is assigned, allocated or migrated to the Standby SBC Pod 212 for its use in communicating with other entities and incoming messages for that IP address/port to the Standby SBC Pod 212 will be directed to the Standby SBC Pod 212. Operation proceeds from step 3106 to step 3110.

In step 3110, the CNI Plug-in service 216 generates message 3108 and communicates via CNI Add API 217 message 3108 to the Standby SBC Pod 212. The message 3108 confirms that the network interface with IP address/port: IP-1, port 1 has been migrated, e.g., assigned or allocated, to the Standby SBC Pod 212 in response to the request message 3100. Operation proceeds from step 3110 to step 3112.

In step 3112, the Standby SBC Pod 212 receives and processes the message 3108 from the CNI Plug-in service 216 via CNI Add API 217 which confirms that the network interface with IP address/port: IP-1, port 1 previously used by the Active SBC Pod 202 has been migrated to the Standby SBC Pod 212 which can now use the network interface IP-1 port 1 for communicating with other entities and can take over providing the SBC services that the Active SBC Pod 202 had been previously providing prior to its failure. Operation proceeds from step 3112 to step 3114.

In step 3114, the Standby SBC Pod 212 changes its mode of operation from standby mode of operation to active mode and begins providing session border controller services using the IP address/port: IP 1 port 1 network interface. This network interface is now part of the namespace: workspace-2 and can have a network interface name different than the network interface name used in workspace-1 of Node 1. For example, it can be assigned network interface name: net-20 which is different than network interface name net-0 used in workspace-1.

It should be understand that when the Active SBC Pod 202 fails, e.g., prior to step 3008, though not shown, the CNI Plug-in Daemon 211 which is a standard Kubernetes application at the Node 1 106 independently detects this failure condition and communicates a request to the kubelet 209 also at Node 1 106 to delete the interfaces of the Active SBC Pod 202 that are known or visible to kubelet 209. In this example, this includes eth0 interface. This is done as part of the cleanup operation normally performed by the Kubernetes system. However, as previously explained the additional network interface(s) that were obtained by the Active SBC Pod 202 are not known to or visible to the kubelet 209 and therefore the Active SBC Pod 202's association with those additional network interface(s) cannot be deleted as part of the standard Kubernetes cleanup operations when a failed Pod is detected. That is the additional network interface(s) obtained by/assigned to/associated with the Active SBC Pod 202 namespace: workspace-1 will remain hence the need for the method/signaling 3000 which migrates and/or changes the allocation, assignment and/or association of the additional interface(s) to the Standby SBC Pod 212 which then switches to an active mode of operation in which it uses the migrated network interface to take over providing the SBC services previously being provided by the Active SBC Pod. This allows the SBC defined service which has two instances an Active SBC instance or Pod and a Standby SBC instance or Pod to provide redundancy for the overall service.

In some cases, the Interface Cleanup Pod 204 receives the request message 3062 requesting the deletion of the specified network interfaces for Node Id: Node 1, namespace: workspace-1, network interface name: net-0, prior to the CNI Plug-in Daemon 211 detecting that the Active SBC Pod 202 has failed or prior to the completion of the cleanup of the Active SBC Pod 202 after the CNI Plug-in Daemon 211 has detected its failure. In such cases, the Interface Cleanup Pod 204 upon checking the status of the Active SBC Pod 202 will receive an indication that the Active SBC Pod 202 is still functioning/operating and has not failed. The Interface Cleanup Pod 204 will then generate a message indicating that the requested network interface(s) have not been deleted as the Active SBC Pod 202 to which network interface(s) are assigned or allocated is still alive. The generated message will then be communicated to the Interface Cleanup Pod 214. The Interface Cleanup Pod 214 upon receiving the message will repeat its request to delete the specified interface by resending message 3062 to the Interface Cleanup Pod 204. The Interface Cleanup Pod 214 will repeat this process of resending the interface deletion request message 3062 until a confirmation of the deletion of the interface(s) requested is received or a predetermined threshold number of attempts to delete the specified network interface(s) has been reached or exceeded without success. If the predetermined threshold number of attempts to delete the specified network interface(s) has been reached or exceeded without success, the Interface Cleanup Pod 214 stops resending requests to delete the network interface(s) to the Cleanup Interface Pod 204 and instead generates and communicates a message to the Standby SBC Pod 212 that the delete network interface request was not completed.

In some embodiments, this message further includes an indication that the Active SBC Pod 204 has been reported as being alive, still operating or not having failed. When the Standby SBC Pod 212 receives this message from the Interface Cleanup Pod 214, the Standby SBC Pod 212 will attempt to confirm whether or not the Active SBC Pod 202 is alive, if it confirms that the Active SBC Pod 202 is alive and functioning it will return to monitoring the Active SBC Pod 202 for a failure condition. If however, it determines that the Active SBC Pod 202 has failed or is not responding to communications, the Standby SBC Pod 212 will once again communicate an interface cleanup message, e.g., by re-sending message 3054, to the Interface Cleanup Pod 214 to delete the interface(s) of the Active SBC Pod 202. The Standby SBC Pod 212 in some embodiments makes a predetermined number of attempts to have the Active SBC Pod 202's network interface(s) deleted. If they all fail the Standby SBC Pod 212 will determine that an unrecoverable failure has occurred with respect to the SBC service being offered and will terminate or cease operations by requesting the SBC service including both the Active SBC Pod 202 and Standby SBC Pod 212 be deleted.

It is to be understood that while the method 3000 is describing as communicating or sending messages between Pods, kubelets, and/or applications, this also includes invoking or calling Pods, kubelets and/or applications and/or passing them request(s), information and/or data.

In some embodiments, the Interface Cleanup Service operations are performed by a Daemon as opposed to a Pod.

Figure 4:
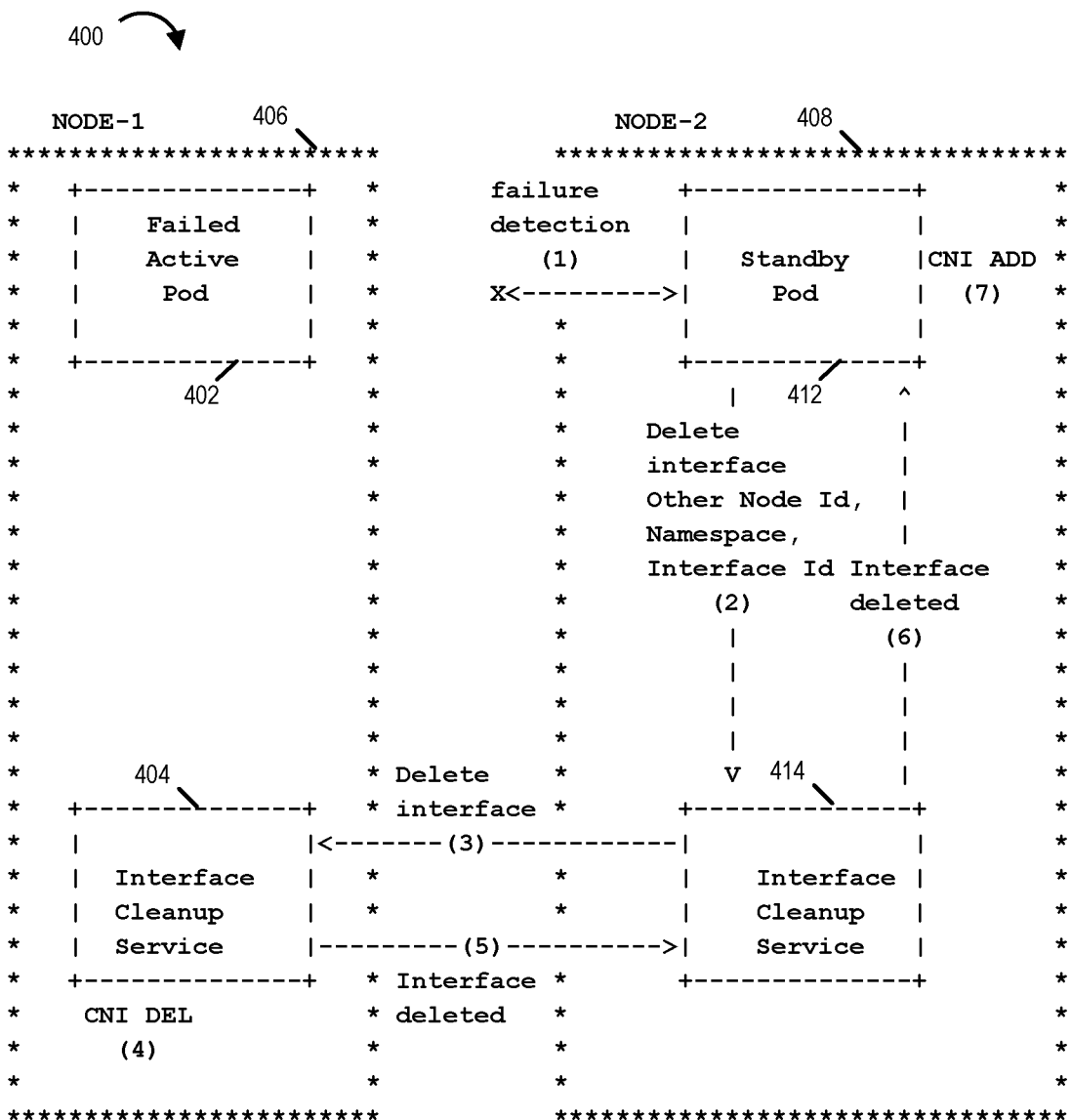
FIG. 4 illustrates another exemplary pair of Kubernetes nodes and the communications between entities in accordance with an embodiment of the present invention.

FIG. 4 illustrates another embodiment of the present invention in which the illustrated signaling and steps (1), (2), (3), (4), (5), (6) and (7) shows the operations performed in system 400 to migrate a network interface from a Failed Active Pod 402 on a Kubenetes first node, i.e., Node 1 406, to a Standby Pod 408 on a second Kubenetes node, Node 2 408. The system 400 includes Kubenetes Node-1 406, Kubenetes Node-2 408 and one or more communications links connecting the two nodes over which messages, e.g., health check messages, delete interface messages, interface deleted messages are exchanged.

In the system 400, the Node Id, namespace and network interface information, e.g., IP address/ports, added by the instances, e.g., Active Pod and Standby Pod, are exchanged and stored at each node during the process used to select which Pod 402 or 412 will operate in active mode of operation and which of the Pods will operate in the standby mode of operation. In this example, Active Pod 402 was selected to operate in the active mode of operation and Standby Pod 412 was selected to operate in the Standby mode of operation. It should be noted that the Active Pod 402 and Standby Pod 412 have sufficient privileges to call container network interface (CNI) primitives, e.g., a CNI ADD API of the CNI plug-in application to add a network interface and a CNI DELETE API of the CNI plug in application to delete a network interface. The CNI DELETE API of the CNI plug in application also being referred to as the CNI DEL API. In this example, the Active Pod 402 upon determination that it was to operate in the active mode of operation called the CNI plug-in application using the CNI ADD API and obtained an additional interface unknown to and not visible to the kubernetes standard system applications, e.g., kubelet executing on Node-1 406.

When the Active Pod fails the interfaces known to the Kubernetes system, i.e., the standard Kubernetes functions, are cleaned up by a kubelet application executing on Node-1 406 after it is detected that Active Pod 402 has failed. This detection may occur at Node-1 406, by a Kubernetes Daemon application being executed on Node-1 406. For interfaces added by Instances themselves, e.g., Active Pod 402, an Interface Cleanup Service Pod at the failed node handles the cleanup as will be explained below in connection with FIG. 4.

The CNI DEL primitive of the CNI plug-in application needs to be called on the Node on which the corresponding CNI ADD primitive was called which in this case was on Node-1 406. This is needed when a Pod dies or ceases to function but the virtual machine is still alive. For the Kubernetes visible interfaces, e.g., eth0, this cleanup of the known interfaces is done by the kubelet on the node on which the Pod died which in this case is Node-1 406. For interfaces not visible to Kubernetes, e.g., net0, this interface cleanup should be done by another entity and that would be Interface Cleanup Service Pod 404.

In step (1), the Standby Pod 412 detects the failure of the Active Pod 402. Operation proceeds from step (1) to step (2). In step (2), the Standby Pod 412 in response to the detection of the failure of the Active Pod 402 generates and sends a Delete Interface request including the failed Active Pod Node-Id, namespace and network interface identification information to the Interface Cleanup Service Pod 414. Operation proceeds from step (2) to step (3).

In step (3) the Interface Cleanup Service Pod 414 in response to receiving the Delete Interface request generates and sends a Delete Interface message to Interface Cleanup Service Pod 404 on the failed Active Pod's node, i.e., Node-1 406. Operation proceeds from step (3) to step (4).

In step (4), the Failed Active Pod node's (Node-1 406's) Interface Cleanup Service Pod 404 receives and processes the Delete Interface message sent from the Interface Cleanup Service Pod 414. In response to the received Delete Interface message, the Interface Cleanup Service Pod 414 calls CNI plug in application via the CNI delete primitive providing information specifying the network interface to be deleted. The CNI plug in application deletes the association of the specification network interface with the Failed Active Pod 402. Operation proceeds from step (4) to step (5).

In step (5), the Interface Cleanup Service Pod 4 in response to receiving confirmation from the CNI DEL primitive that the specified interface was deleted, generates an Interface Deleted message confirming the deletion of the specified interface and sends the Interface Deleted message to Interface Cleanup Service Pod 414. Operation proceeds from step (5) to step (6).

In step (6), the Interface Cleanup Service Pod 414 on the Standby Pod's Node, i.e., Node 2 408, receives the Interface Deleted message from the Interface Cleanup Service Pod 404 and in response to receiving the message generates a Interface Deleted message that it sends to the Standby Pod 412 to confirm the deletion of the specified interface. Operation proceeds from step (6) to step (7).

In step (7), the Standby Pod 412 receives the Interface Deleted message sent from the Interface Cleanup Service Pod 414 and upon processing the message and confirming the deletion of the specified interface calls the CNI Add primitive of the CNI plugin application requesting that the interface deleted from the Failed Active Pod be added or migrated to the Standby Pod 412. In this way, the IP address/port previously being used to provide services by the Failed Active Pod 402 can now be used by the Standby Pod 412 to take over providing services for the Failed Active Pod 402.

Figure 5A:
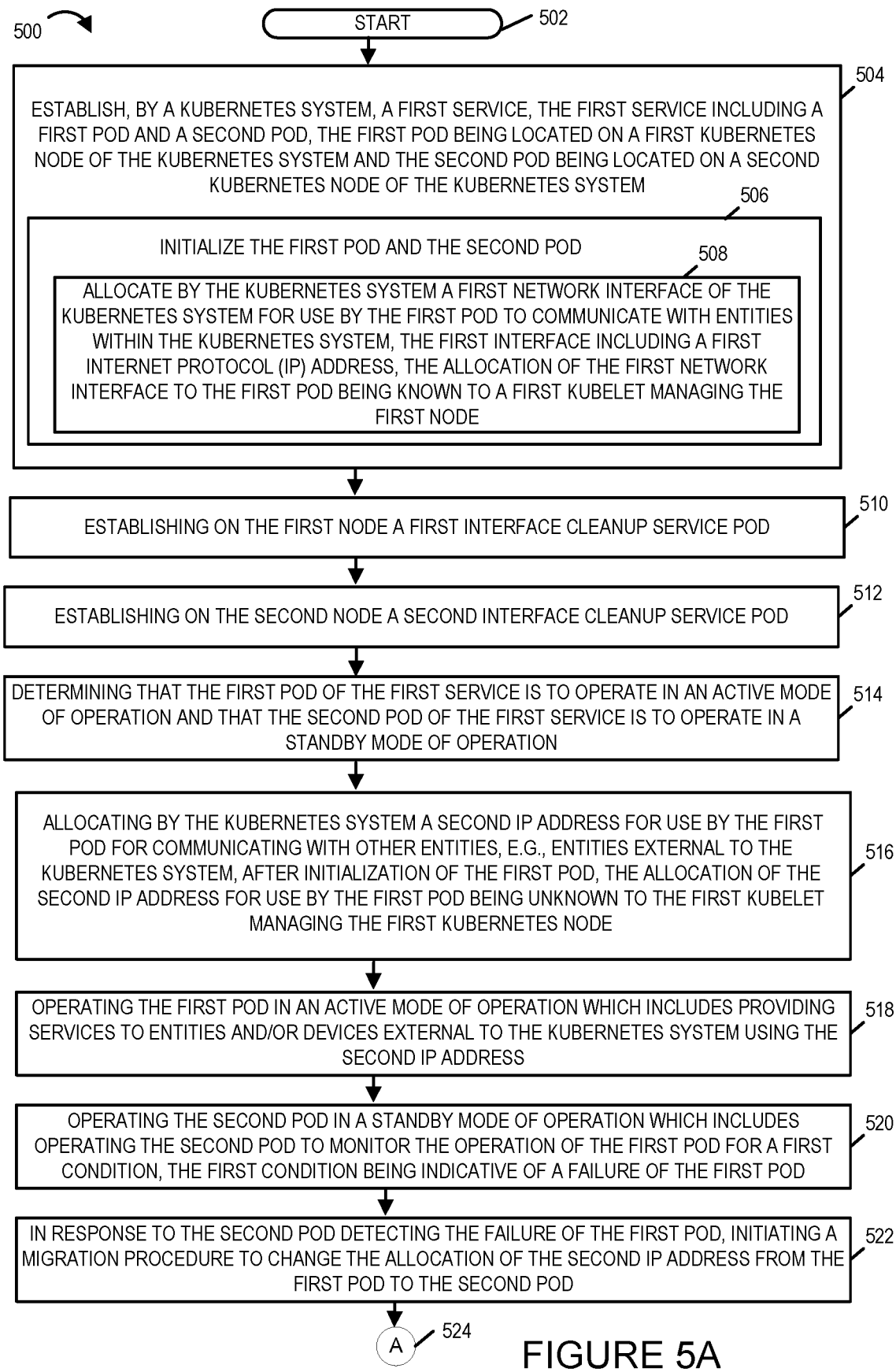
FIG. 5A illustrates a first part of a flowchart of an exemplary method in accordance with an embodiment of the present invention.
Figure 5B:
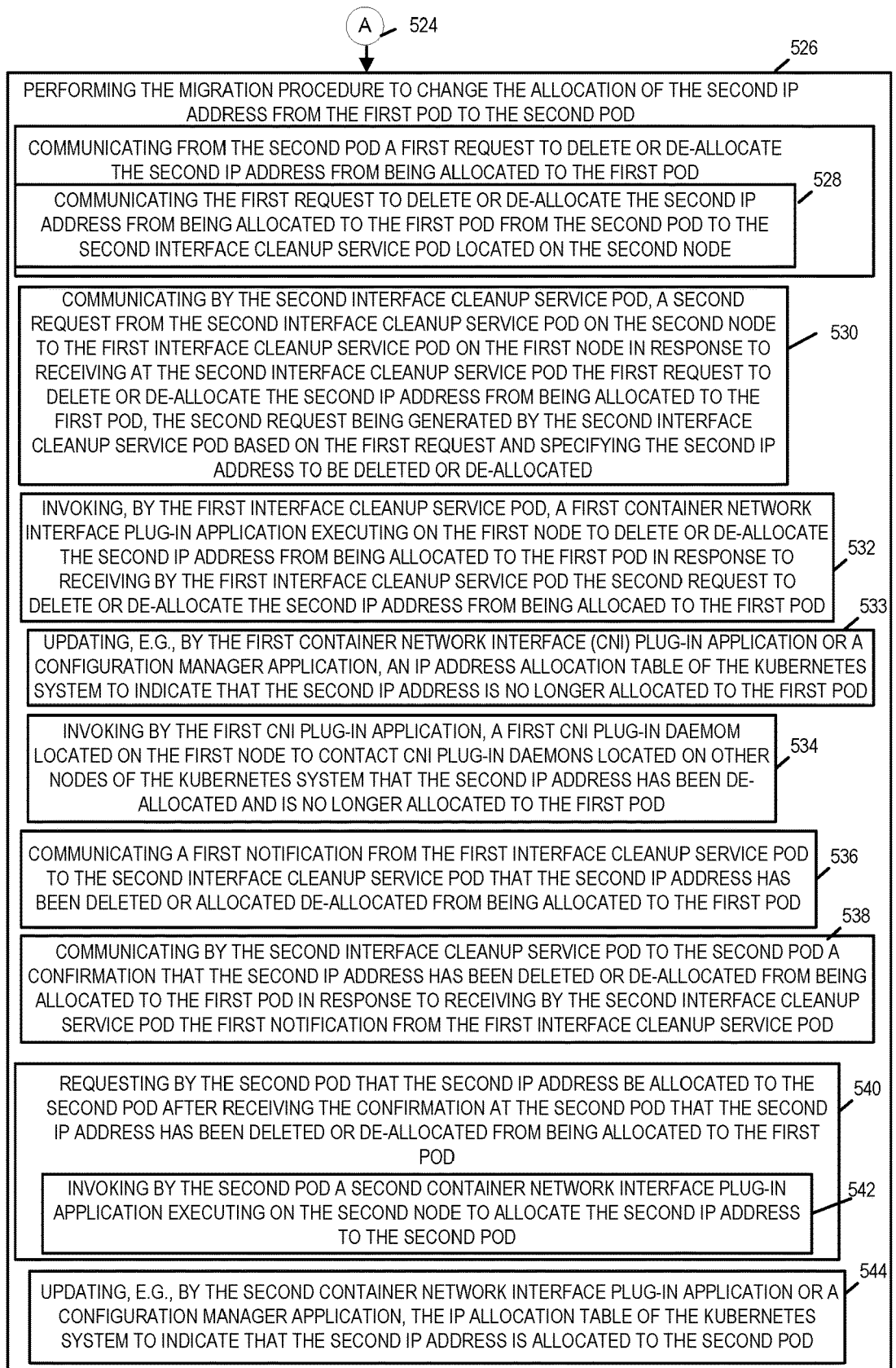
FIG. 5B illustrates a second part of a flowchart of an exemplary method in accordance with an embodiment of the present invention.

FIG. 5 comprises FIGS. 5A, 5B, and 5C. FIG. 5A illustrates a first part of a flowchart of an exemplary method in accordance with an embodiment of the present invention. FIG. 5B illustrates a second part of a flowchart of an exemplary method in accordance with an embodiment of the present invention. FIG. 5C illustrates a third part of a flowchart of an exemplary method in accordance with an embodiment of the present invention. FIG. 5 illustrates another exemplary method 500 in accordance with an embodiment of the present invention. Method 500 is a method of operating a communications system, e.g., a Kubernetes system. FIG. 5, may be, and in some embodiments is, implemented on the system 100 illustrated in FIG. 1.

The exemplary method of operating a Kubernetes system commences in start step 502 shown on FIG. 5A and proceeds from step 502 to step 504.

In step 504, the Kubernetes system (e.g., system 100), establishes a first service, the first service including a first Pod (e.g., Pod 202) and a second Pod (e.g., Pod 212). The first Pod being located on a first Kubernetes node (e.g., node 106) of the Kubernetes system and the second Pod being located on a second Kubernetes node (e.g., node 108) of the Kubernetes system. Step 504 includes sub-step 506. In sub-step 506, establishing the first service includes initializing the first Pod and the second Pod. Sub-step 506 includes sub-step 508, wherein initializing the first pod includes allocating by the Kubernetes system a first network interface of the Kubernetes system for use by the first Pod to communicate with entities within the Kubernetes system. The first network interface including first Internet Protocol (IP) address. The allocation of the first network interface to the first Pod being known to the first Kubelet (e.g., Kubelet 209) managing the first node.

An exemplary first service is a Session Border Controller (SBC) service in which SBC services are provided. SBC services including for example, the regulation of various forms of real-time communications including Voice Over Internet Protocol (VoIP), IP video, text chat and collaboration sessions. SBC services include the manipulation of IP communications signaling and media streams, providing a variety of functions such as security in which the services protect against Denial of Service (DoS) and Distributed DoS (DDoS) attacks, safeguard against toll fraud and service theft, and provide media and signaling encryption to ensure confidentiality and protect against impersonation/masquerade; Multivendor interoperability functions in which the services normalize SIP (Session Initiation Protocol) signaling stream headers and messages to mitigate multivendor incompatibilities; Protocol interworking functions in which the services enable interworking between diverse protocols (i.e. SIP-to-H.323) or diverse codecs (i.e. g.711 to g.729 transcoding); Quality of service (QoS) functions in which the services enforce call admission control (CAC) policies, type of service (ToS) marking, or rate limiting for service quality assurance, and Session routing in which the services route sessions across network interfaces to ensure high availability or enable least cost routing (LCR).

Though not shown, during the initialization of the second Pod, the Kubernetes system also allocates an IP address to the second Pod for communicating with entities within the Kubernetes system, the allocated IP address being known to the Kubelet (e.g., Kubelet 219) located on the second node Pod being known to the second Kubelet (e.g., Kubelet 209) managing the second node. The IP address allocated to the second Pod being different than the IP address allocated to the first Pod. Operation proceeds from step 504 to step 510.

In step 510, the Kubernetes system establishes on the first node a first Interface Cleanup Service Pod (e.g., Interface Cleanup Service Pod 1 204 located on node 106). Operation proceeds from step 510 to step 512.

In step 512, the Kubernetes system establishes on the second node a second Interface Cleanup Service Pod (e.g., Interface Cleanup Service Pod 1 214 located on node 108). Operation proceeds from step 512 to step 514.

In step 514, a determination is made that the first Pod of the first service is to operate in an active mode of operation and the second Pod of the first service is to operate in a standby mode of operation. The determination may be, and in most embodiments is made, as part of the establishment of the first service. In some embodiments, the determination is made by negotiations or an election between the first Pod and the second Pod of the first service. Operation proceeds from step 514 to step 516.

In step 516, the Kubernetes system allocates a second IP address to the first Pod after initialization of the first Pod. The second IP address is for use by the first Pod for communicating with other entities, e.g., entities external to the Kubernetes system. The allocation of the second IP address for use by the first Pod being unknown to the first Kubelet managing the first Kubernetes node. The second IP address being different than the first IP address allocated to the first Pod or the IP address allocated to the second Pod. The second IP address being allocated to the first Pod via a direct invocation or call from the first Pod to a CNI Add Application Programming Interface (e.g., CNI ADD API 207) of a first CNI Plug-In application (e.g., CNI Plug-in 206) located on the first node. The invocation or call requesting the allocation of an additional IP address and specifying the IP address. The request not being made via the Kubelet managing the first node (e.g., Kubelet 209). In response to the request, the CNI Plug-In application allocates the second IP address to the first Pod. This allocation of the second IP address to the first Pod is unknown to the Kubelet managing the first node (e.g., Kubelet 209).

On an on-going basis as part of implementing the first service, the first Pod and second Pod share information about their state and the state of services if any being providing. Among the information shared is the second IP address the first Pod has been allocated. For example, the first Pod communicates the second IP address to the second Pod after being allocated it.

Operation proceeds from step 516 to step 518. In step 518, the first Pod begins operating in an active mode of operation which includes providing services to entities and/or devices external to the Kubernetes system using the second IP address. For example, when the first service is a Session Border Controller (SBC) service, the first Pod begins providing SBC services in response to messages/requests received on the second IP address from entities and/or devices external to the Kubernetes system. Operation proceeds from step 518 to step 520.

In step 520, the second Pod begins operating in a standby mode of operation which includes operating the second Pod to monitor the operation of the first Pod for a first condition, the first condition being indicative of a failure of the first Pod. The second Pod while operating in the standby mode of operation does not provide services of the first service type, e.g., SBC services, to entities external to the Kubernetes system. Second Pod in standby mode of operation is standing by to take over providing such services upon the detection of the failure of the first Pod which is in the active mode of operation and is providing the services of the first type, e.g., SBC services. In some embodiments, the first condition being indicative of a failure of the first Pod includes one of the following: (i) a failure to receive at the second Pod from the first Pod heartbeat signals, or (ii) a failure to receive at the second Pod from the first Pod responses to health check messages communicated from the second Pod to the first Pod.

Operation proceeds from step 520 to step 522. In step 522, in response to the second Pod detecting the failure of the first Pod, the first Pod initiates a migration procedure to change the allocation of the second IP address from the first Pod to the second Pod. Operation proceeds from step 522 via connection node A 524 to step 526 shown on FIG. 5B.

In step 526, the migration procedure to change the allocation of the second IP address from the first Pod to the second Pod is performed.

In some embodiments, step 526 includes one or more sub-steps 527, 530, 532, 533, 534, 536, 538, 540, and 544.

In sub-step 527, a first request to delete or de-allocate the second IP address from being allocated to the first Pod is communicated from the second second Pod. Prior to communicating the first request, the second Pod generates the first request based on information shared with the second Pod by the first Pod including information about the second address IP information. In some embodiments, sub-step 527 includes sub-step 528. In sub-step 528, the second Pod communicates the first request to delete or de-allocate the second IP address from being allocated to the first Pod from the second Pod to the Second Interface Cleanup Service Pod located on the second node.

In sub-step 530, the second Interface Cleanup Service Pod (e.g., Interface Cleanup Service Pod 1 214) communicates from the second Interface Cleanup Service Pod located on the second node to the first Interface Cleanup Service Pod (e.g., Interface Cleanup Service Pod 1 204) located on the first node in response to receiving at the second Interface Cleanup Service Pod the first request to delete or de-allocate the second IP address from being allocated to the first Pod. The second request being generated by the second Interface Cleanup Service Pod based on the first request and specifying the second IP address to be deleted or de-allocated.

In sub-step 532, the first Interface Cleanup Service Pod (e.g., Interface Cleanup Service Pod 1 204) invokes a first Container Network Interface (CNI) Plug-in application (e.g., CNI Plug-in 206) executing on the first node to delete or de-allocate the second IP address from being allocated to the first Pod in response to receiving by the first Interface Cleanup Service Pod the second request to delete or de-allocate the second IP address from being allocated to the first Pod. In some embodiments, the first Interface Cleanup Service Pod invokes the first CNI Plug-in application via a CNI Add application programming interface (e.g., CNI ADD API 207).

In sub-step 533, an IP address allocation table used by the Kubernetes System for managing IP address allocations is updated to indicate that the second IP address is no longer allocated to the first Pod. The update may be, and in some embodiments is performed by the first CNI Plug-in application or by a configuration manager in response to a communication, e.g., a message, from the CNI Plug-in application. In some embodiments, the IP address allocation table is maintained or managed by the master node (e.g., master node 105) and stored in memory of master node 105 and/or in the database 134. In some embodiments, the CNI Plug-in application updates an IP address allocation table located in the memory of the first node to indicate that the second IP address is no longer allocated to the first Pod. In some embodiments, the second IP address when allocated to the first Pod was also bound to the first service and when the second IP address is deleted or de-allocated from being allocated to the first Pod remains bound or allocated to the first service so that it is not available for allocation to the other services or other Pods which are not part of the first service.

In sub-step 536, a first notification is communicated from the first Interface Cleanup Service Pod on the first node to the second Interface Cleanup Service Pod on the second node that the second IP address has been deleted or de-allocated from being allocated to the first Pod.

In sub-step 538 the second Interface Cleanup Service Pod on the second node communicates that a confirmation, e.g., confirmation message, that the second IP address has been deleted or de-allocated from being allocated to the first Pod in response to receiving by the second Interface Cleanup Service Pod the first notification from the first Interface Cleanup Service Pod on the first node.

In sub-step 540, the second Pod requests that the second IP address be allocated to the second Pod after receiving the confirmation at the second Pod that the second IP address has been deleted or de-allocated from being allocated to the first Pod. In some embodiments, sub-step 540 includes sub-step 542.

In sub-step 542, the second Pod invokes a second container network interface plug-in application (e.g., CNI Plug-in 216) executing on the second node to allocate the second IP address to the second Pod. In some embodiments, the invocation is made via a CNI Add API (e.g., CNI Add API 217) of the CNI Plug-in application (e.g., CNI Plug-In 216). In some embodiments, the invocation is a routine call or message sent to the CNI Plug-in application which includes the second IP address.

In sub-step 544, the IP address allocation table used by the Kubernetes System for managing IP address allocations is updated to indicate that the second IP address is now allocated to the second Pod. The update may be, and in some embodiments is performed by the second CNI Plug-in application (e.g., CNI Plug-in application 216) or by a configuration manager in response to a communication, e.g., a message, from the second CNI Plug-in application. In some embodiments, the IP address allocation table is maintained or managed by the master node (e.g., master node 105) and stored in memory of master node 105 and/or in the database 134. In some embodiments, the second CNI Plug-in application updates an IP address allocation table located in the memory of the second node to indicate that the second IP address is allocated to the second Pod. In some embodiments, the second IP address when allocated to the second Pod remains bound to the first service as the second Pod is part of the first service. In some embodiments, the second CNI Plug-in application located on the second node also notifies invokes the CNI plug-in Daemon located on the second node (e.g., CNI plug-in daemon 221) to notify CNI Plug-in daemons on other nodes of the update of the allocation of the second IP address which is now allocated for use by the second Pod which is located on the second node.

Operation proceeds from step 526 via connection node B 546 to step 548 shown on FIG. 5C.

In step 548 the second Pod switches from standby mode of operation to an active mode of operation after receiving notice at the second Pod that the second IP address has been allocated to the second Pod. The active mode of operation including providing services to entities and/or devices external to the Kubernetes system using the second IP address, e.g., Session Border Controller services when the first service is a session border controller service. Operation proceeds from step 548 to step 550.

In step 550, one or more messages, e.g., request for services messages, are received at a physical interface of the Kubernetes system the message being directed to the second IP address and being received from entities external to the Kubernetes system. Operation proceeds from step 550 to step 552.

In step 552, the Kubernetes system routes the one or more messages to the second Pod. Operation proceeds from step 552 to step 554.

In step 554, receiving at the second Pod the one or more messages routed to the second Pod. The one or more messages including one or more messages for on-ongoing services previously being provided by the first Pod before the first Pod's failure. Operation proceeds from step 554 to step 556.

In step 556, the second Pod provides services of a first service type in response to the one or more messages received at the second Pod. For example, SBC services would be provided when the first services is an SBC service. The services provided including the continuation of services previously provided by the first Pod before the first Pod's failure. For example, if the first Pod had been providing SBC services, e.g., management of a SIP session between a first user equipment device (e.g., UE 1 114) and a second user equipment device (e.g., UE P 116), the second Pod would take over management of the SIP session between first and second user equipment devices. In doing so, the services provided by the first service are maintained without the need to re-negotiate a new IP address for communications with the second Pod which is now operating in the active mode of operation. To the external entities receiving the services of the first service, the switchover does not result in the termination of services but instead in the continuation of services. Operation proceeds from step 556 to step 558. In step 558 the method ends.

In some embodiments of the method, instead of the second IP address being allocated and migrated from the first Pod to the second Pod, an entire second interface including the second IP address is allocated and then migrated to the second Pod. The may be, and in some embodiments, is implemented by the method 500 wherein the steps of the method 500 remain the same or substantially the same but the references to the second IP address are replaced with the second interface including the second IP address.

Figure 6:
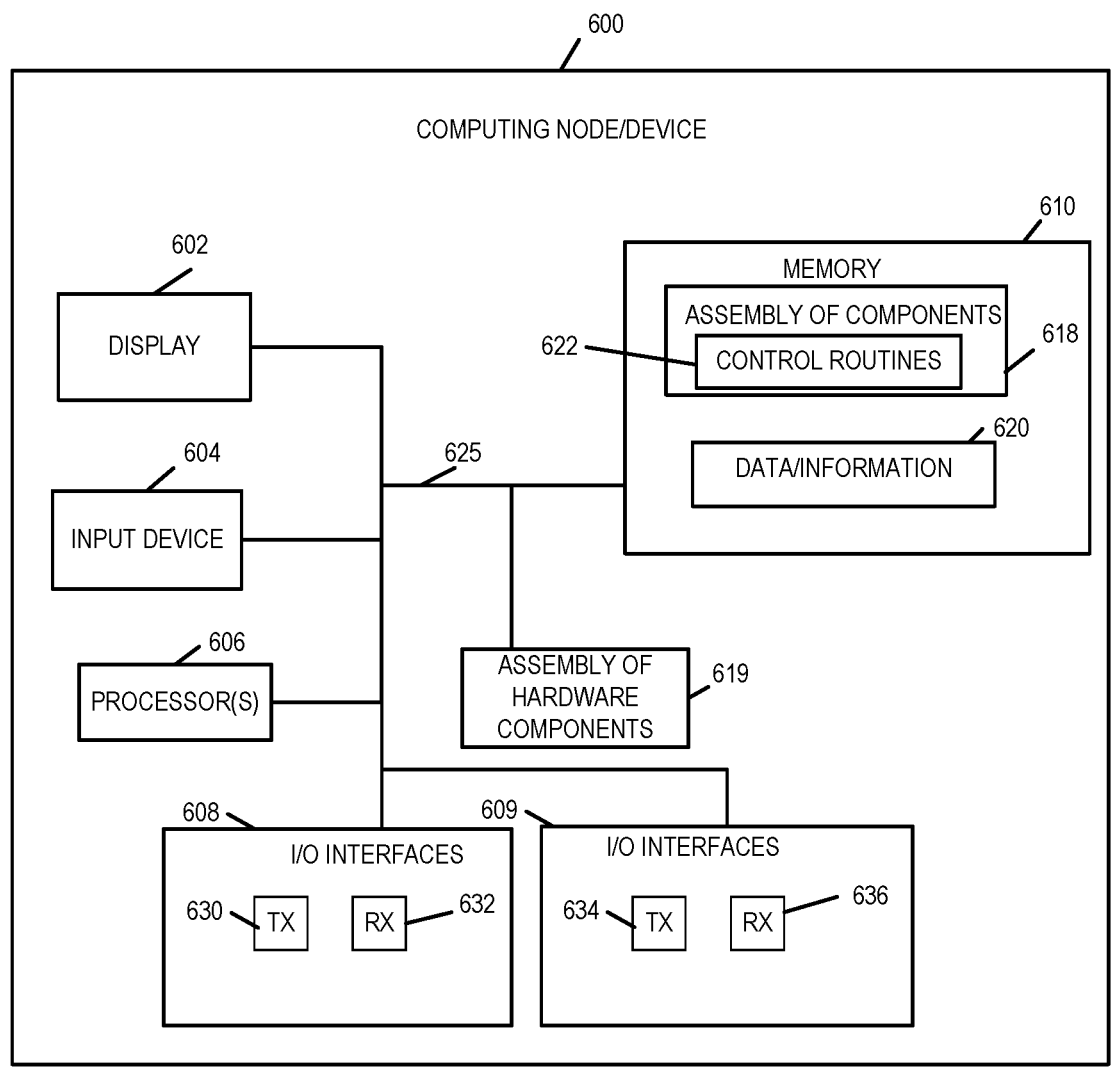
FIG. 6 illustrates an exemplary computing device/node, e.g., Kubernetes Node in accordance with an embodiment of the present invention.

In some embodiments, one or more of the elements, nodes or components of the above mentioned systems are implemented in accordance with the exemplary computing device/node 600 illustrated in FIG. 6.

Exemplary computing device/node 600 includes an optional display 602, an input device 604, a processor 606, e.g., a CPU, I/O interfaces 608 and 609, which couple the computing device/node 600 to networks or communications links and/or various other nodes/devices, memory 610, and an assembly of hardware components 619, e.g., circuits corresponding to different components and/or modules, coupled together via a bus 625 over which the various elements may interchange data and information. Memory 610 includes an assembly of components 618, e.g., an assembly of software components, and data/information 620. The assembly of software components 618 includes a control routines component 622 which includes software instructions which when processed and executed by processor 606 control the operation of the computing device/node 600 to perform various functions and/or one or more steps of the various method embodiments of the invention. The I/O interface 608 includes transmitters 630 and receivers 632. The I/O interface 609 includes transmitters 634 and receivers 636. The I/O interfaces are hardware interfaces including hardware circuitry. The computing device/node 600 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Internet Protocol (IP), Transport Control Protocol (TCP), User Datagram Protocol (UDP), Representative State Transfer (REST) protocol, SQL (Structured Query Language) Protocol, and HDFS (Hadoop Distributed File System) Protocol, SQL and/or HDFS being used to interface and access information from the various databases and/or storage devices to which it may be coupled. In some embodiments, the computing device/node 600 includes a communication component configured to operate using IP, TCP, UDP, REST, SQL (Structured Query Language), or HDFS (Hadoop Distributed File System). In some embodiments, the communications component is a hardware component, a software component or a component including hardware and software components. While only a single hardware processor is illustrated in some embodiments, it is to be understood that the computing device/node 600 can include more than one processor with the processing being distributed among the plurality of processors. The Pods and other programs/applications being executed on a Kubernetes node, e.g., nodes, 105, 106, and 108 described in connection with FIG. 2 may be, and in some embodiments are, implemented one of the components of the assembly of components 618 or 619 of computing node 600. In some embodiments, one or more of the following are implemented in accordance with the computing device/node 600 illustrated in FIG. 6: master node 105, node 106, node 108, user equipment 1 114, . . . , UE P 116, NE 1 118, . . . , NE 1 120.

Figure 7:
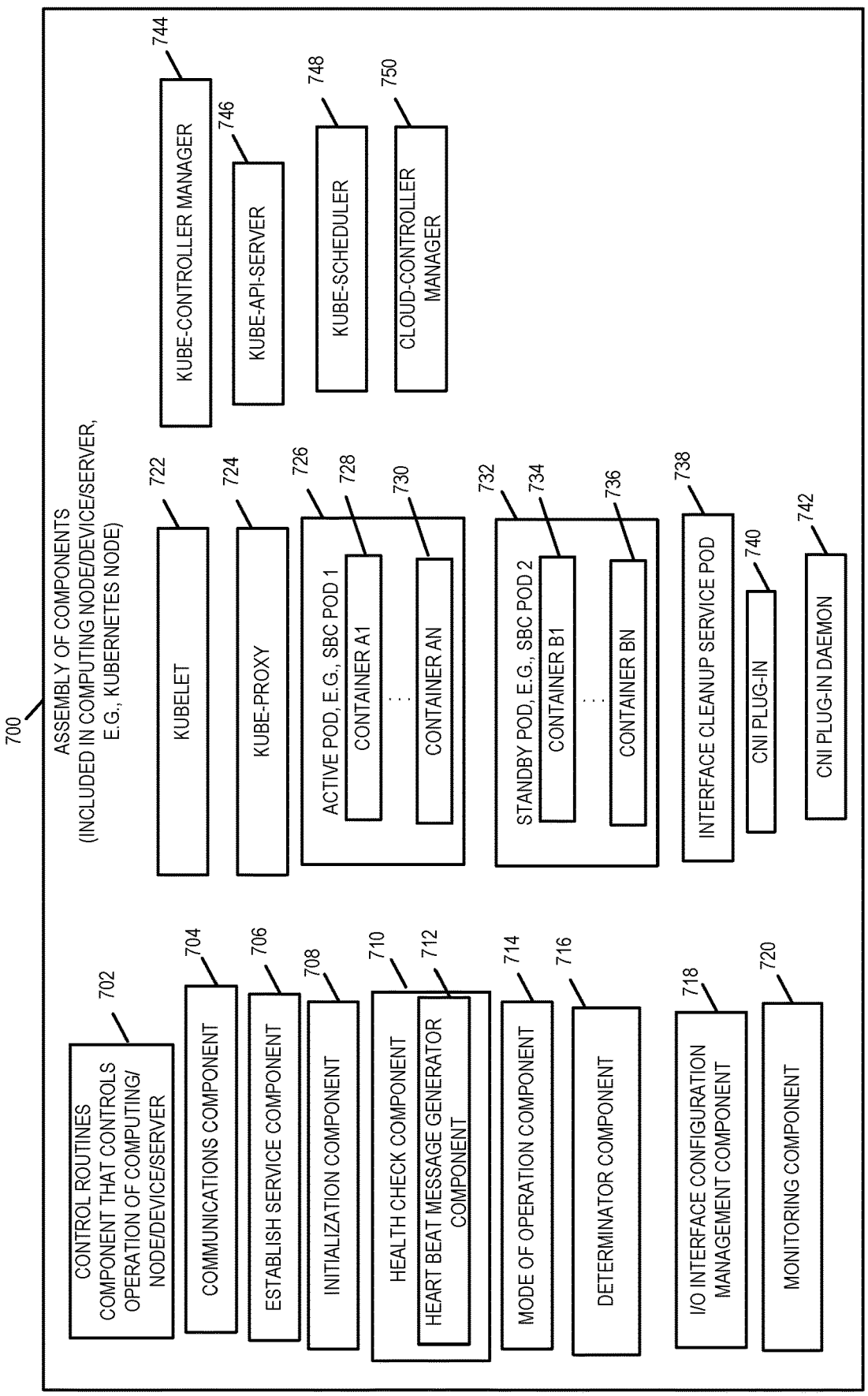
FIG. 7 illustrates an assembly of components for use in an exemplary computing device/node in accordance with an embodiment of the present invention.

An exemplary assembly of components 700 for a computing node 600 implemented as a node or device, e.g., a Kubernetes master node or worker node in accordance with an embodiment of the present invention is illustrated in FIG. 7. One or more of the assembly of components 700 may be implemented as hardware components in the assembly of hardware components 619 or as software components in the assembly of software components 618 stored in memory 610 of the exemplary computing node/device 600. The assembly of components 700 will be discussed in further detail below. Each node or device may implement one or more of the components but need not implement all of the components, e.g., work nodes, do not need to implement components for a master node such as for example the Kube-controller manager component 744. Similarly a master node need not implement an Active Pod component 726.

FIG. 7 as discussed above is a drawing illustrating an assembly of components 700 which may be included in an exemplary computing node or device 600 when implemented as a node or device implemented one or more of the steps of the methods described or of the functions attributed to various components of the systems described herein. Assembly of components 700 can be, and in some embodiments is, used in computing node 600. The components in the assembly of components 700 can, and in some embodiments are, implemented fully in hardware within the processor 606, e.g., as individual circuits. The components in the assembly of components 700 can, and in some embodiments are, implemented fully in hardware within the assembly of components 619, e.g., as individual circuits corresponding to the different components. In other embodiments some of the components are implemented, e.g., as circuits, within the processor 606 with other components being implemented, e.g., as circuits within assembly of components 619, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 610 of the computing node 600, with the components controlling operation of computing node 600 to implement the functions corresponding to the components when the components are executed by a processor, e.g., processor 606. In some such embodiments, the assembly of components 700 is included in the memory 610 as assembly of components 618. In still other embodiments, various components in assembly of components 700 are implemented as a combination of hardware and software, e.g., with another circuit external to the processor providing input to the processor 606 which then under software control operates to perform a portion of a component's function. While shown in the FIG. 6 embodiment as a single processor, e.g., computer, it should be appreciated that the processor 606 may be implemented as one or more processors, e.g., computers.

When implemented in software the components include code, which when executed by the processor 606, configure the processor 606 to implement the function corresponding to the component. In embodiments where the assembly of components 700 is stored in the memory 610, the memory 610 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the computing node or device 600 or elements therein such as the processor 606, to perform the functions or corresponding steps illustrated and/or described in the method of flowchart of FIG. 10 and/or described with respect to any of the Figures. Thus the assembly of components 700 includes various components that perform functions of corresponding steps of FIGS. 3, 4 and 5.

Assembly of components 700 includes components 702, 704, 706, 708, 710, 712, 714, 716, 718, 720, 722, 724, 726, 728, 730, 732, 734, 736, 738, 740, 742, 744, 746, 748, and 750.

The control routines component 702 is configured to control the operation of the node or device.

The communications component 704 is configured to provide communications functionality including communications signaling and support for various communications protocols and interfaces. The communications component also generates messages.

The establish service component 706 is configured to perform operations to establish a service, e.g., a service which provides session border controller services.

The initialization component 708 is configured to perform initialization operations on the node when the node is initialized and/or entities such as Pods located on the node are initialized. In some embodiments, the initialization component 708 is a sub-component of component 706 when the initialization operations are part of the establishment of a service.

The health check component 710 monitors components, Pods, interfaces and/or nodes for there health and status, e.g., monitoring for an indication of a failure of a component, Pod, node, or interface. The health check component when in a Pod in standby mode of operation on a first node monitors the health of a Pod in an active mode of operation on a different node for an indication of a failure condition. In some embodiments, the health check component 710 includes heart beat message generator component 712 which generates heart beat messages to be sent to another component, device or node. The heart beat message generator component 712 also generates messages in response to received health check messages. The health check component also monitors heart signals received from a Pod to determine or detect a failure condition. In some embodiments, the health check component is a sub-component of one or more components in the assembly of components, e.g., a sub-component of the Kubelet component 722, the Active Pod component 726 and the Standby Pod component 732, the CNI Plug-in Daemon component 742.

The mode of operation component 714 determines and configures the mode of operation for a component or Pod such as for example active mode of operation or standby mode of operation. In some embodiments, the mode of operation component is part of a service and operates to elect which node of a service with multiple nodes is to operate in an active mode of operation and which node is to operate in a standby mode of operation. In some embodiments, the mode of operation component is a sub-component of the Active Pod component 726 and the Standby Pod component 732.

The determinator component 716 makes determinations needed by different components and/or Pods or programs executing on a node including for example, determinations as to whether the node should be in stand-by mode of operation or active mode of operation. The determinator component also determines whether a Pod has failed or a node has failed, what IP address to include in a request to add an interface to a Pod or to delete an interface from a Pod. In some embodiments, the determinator component 716 is a sub-component of one or more other components of the assembly of components 700 including for example, the health check component 710, mode of operation component 714, monitoring component 720, Active Pod component 726, the Standby Pod component 732, the Interface Cleanup Service Pod 738, the CNI Plug-in component 740, and the CNI Plug-in Daemon 742 component.

The I/O Interface configuration management component manages the I/O interfaces for the node including allocations of IP addresses and interfaces such as network interfaces. In some embodiments, the I/O Interface configuration management component manages the I/O interfaces for the Kubernetes system including all nodes of the system and allocations of IP addresses and interfaces used by the nodes of the Kubernetes system such as for example when the node on which the component is implemented is a master node.

The monitoring component 720 is configured to perform a monitoring function including monitoring for requests, monitoring for conditions on Pods that indicate a failure of a container of a Pod or a failure of a Pod. The monitoring component 720 may be, and in some embodiments is a sub-component of a health check component 710, an Active Pod 726, and a Standby Pod 732.

The Kubelet component 722 is configured to perform the functions of a Kubernetes Kubelet including the functions described in connection with Kubelet 209 and 219 and the Kubelets discussed in connection with various Figures of the application.

Figure 2:
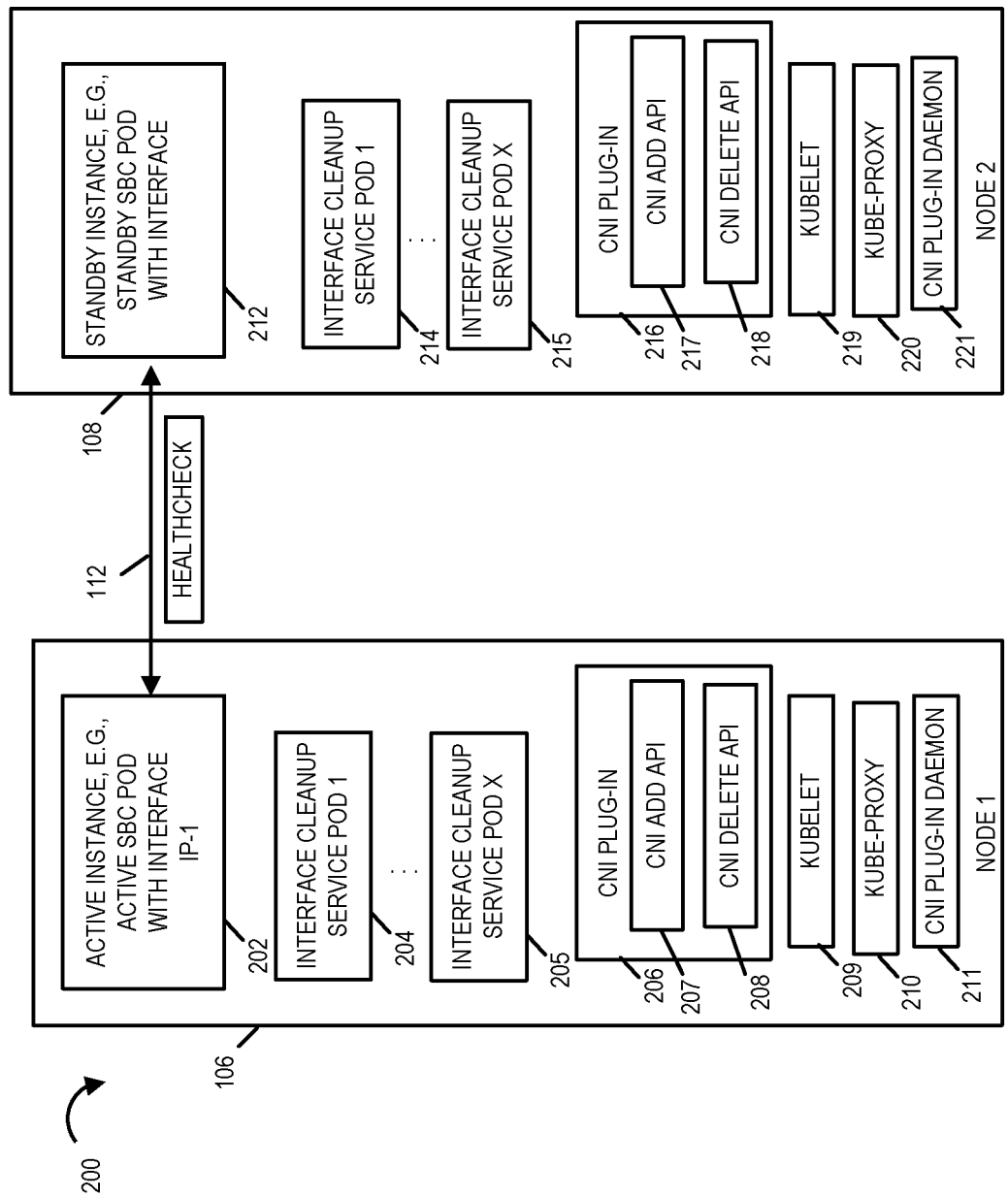
FIG. 2 is a drawing illustrating an exemplary pair of Kubernetes nodes in accordance with an exemplary embodiment.

The Kube-proxy component 724 is configured to perform the functions of a Kubernetes Kube-proxy including the functions described in connection with Kube-proxy 210 and 220 of FIG. 2.

The Active Pod component 726, e.g., a SBC Pod 1 is configured to operate in an active mode of operation in which it receives requests and provides services of a first type, e.g., Session Border Controller services. The Active Pod component 726 is part of a service that includes an Active Pod and a Standby Pod. The Active Pod 726 includes a plurality of containers including container A1 728, . . . , container AN 730, where AN is a positive integer number greater than 1. The Active Pod component 726 is configured to perform the functions/operations discussed in connection with Pod 202 of FIG. 2 and of Pods operating in an active mode of operation in connection with methods described herein as well as the functions/steps described in connection with Active instances of applications on a node such as Pod 202. The containers 728, . . . , 730 are programs or sub-routines which are implemented as part of the Pod and perform various functions/operations on the behalf of the Active Pod 726.

The Standby Pod component 732, e.g., a SBC Pod 2 is configured to operate in a standby mode of operation in which it monitors the health condition of an Active Pod. The Standby Pod component 726 is part of a service that includes an Active Pod and a Standby Pod. The Standby Pod 732 includes a plurality of containers including container B1 734, . . . , container BN 736, where BN is a positive integer number greater than 1. The Standby Pod component 732 is configured to perform the functions/operations discussed in connection with Pod 212 of FIG. 2 and of Pods operating in a standby mode of operation in connection with the methods described herein as well as the functions/steps described in connection with Active instances of applications on a node such as for example Pod 212. For example, the Standby Pod initiates and performs various steps/functions to migrate the IP address and/or network interface from the Active Pod component of the service to the Standby Pod component of the service and then switch to an active mode of operation in which it begins servicing requests. The containers 734, . . . , 736 are programs or sub-routines which are implemented as part of the Pod and perform various functions/operations on the behalf of the Standby Pod 732.

The Interface Cleanup Service Pod component 738 is configured to service requests from other Pods to delete and/or de-allocate IP address allocations and/or interface, e.g., network interface allocations. The Interface Cleanup Service Pod component 738 is configured to perform the steps and/or provide the functions attributed to the Interface Cleanup Service Pods 204 and 214 of FIG. 2 and the steps/functions described in connection with the Interface Cleanup Service Pods in the methods, embodiments and Figures described herein.

The CNI Plug-in component 740 is configured to service requests from other components, e.g., Kubelet and Pods to add or delete and/or de-allocate IP address allocations and/or interface, e.g., network interface, allocations. The CNI Plug-in component 740 is configured to perform the steps and/or provide the functions attributed to the CNI Plug-in applications 206 and 216 of FIG. 2 and the steps/functions described in connection with the CNI Plug-in applications in the methods, embodiments and Figures described herein.

The CNI Plug-in Daemon component 742 is configured to provide inter-node network connectivity. The CNI Plug-in Daemon component 738 is configured to perform the steps and/or provide the functions attributed to the CNI Plug-in Daemons 211 and 221 of FIG. 2 and the steps/functions described in connection with the CNI Plug-in Daemons in the methods, embodiments and Figures described herein.

The Kube-controller manager component 744 is configured to perform the functions of a Kubernetes system Kube-controller manager including the functions described in connection with Kube-controller manager 130 of master node/control plane 105 of FIG. 1.

The Kube-API-server component 746 is configured to perform the functions of a Kubernetes system Kube-API server including the functions described in connection with Kube-API server 136 of master node/control plane 105 of FIG. 1.

The Kube-scheduler component 748 is configured to perform the functions of a Kubernetes system Kube-scheduler including the functions described in connection with Kube-scheduler 138 of master node/control plane 105 of FIG. 1.

The Cloud-controller manager component 750 is configured to perform the functions of a Kubernetes system Cloud-controller manager including the functions described in connection with Cloud-controller manager 132 of master node/control plane 105 of FIG. 1.

Lists of numbered exemplary embodiments illustrating various features of the invention are described below. It should be appreciated that not necessarily all embodiments include the same features and some of the features described in the embodiments are not necessary but can be desirable in some embodiments. With each list of numbered embodiments, the embodiment numbers discussed are for embodiments included in that particular list.

First List of Numbered Exemplary Method Embodiments

Method Embodiment 1. A method of operating a Kubernetes system comprising: establishing, by the Kubernetes system, a first service, said first service including a first Pod and a second Pod, said first Pod being located on a first Kubernetes node of the Kubernetes system and said second Pod being located on a second Kubernetes node of the Kubernetes system, said establishing a first service including initializing said first Pod and initializing said second Pod; said initializing said first Pod including allocating by the Kubernetes system a first network interface of the Kubernetes system for use by the first Pod to communicate with entities within the Kubernetes system, said first network interface including a first Internet Protocol address, said allocation of the first network interface to the first Pod being known to a first Kubelet managing said first Kubernetes node; after initialization of said first Pod allocating by the Kubernetes system a second network interface including a second Internet Protocol address for use by the first Pod, said allocation of said second network interface for use by the first Pod being unknown to the first Kubelet managing said first Kubernetes node, said second network interface being an external network interface; upon failure of the first Pod, changing allocation of said second network interface from said first Pod to said second Pod.

Method Embodiment 2. The method of method embodiment 1, wherein when said first Pod is in an Active mode of operation, the first Pod provides services in response to requests received on the second network interface; and wherein when said second Pod is in a Standby mode of operation, the second Pod does not provide services.

Method Embodiment 3. The method of method embodiment 1, wherein said first service is a Session Border Controller service; and wherein said first and second Pods of the first service provide Session Border Controller services when in an active mode of operation.

Method Embodiment 3A. The method of method embodiment 1, wherein said first and second Pods of the first service do not provide Session Border Controller services when in a standby mode of operation.

Method Embodiment 4. The method of method embodiment 3 further comprising: determining that the first Pod of the first service is to operate in an active mode of operation and that the second Pod of the first service is to operate in a standby mode of operation.

Method Embodiment 5. The method of method embodiment 1 further comprising: operating the first Pod in an active mode of operation, said operating the first Pod in an active mode of operation including providing services to entities and devices external to the Kubernetes system using the second network interface.

Method Embodiment 6. The method of method embodiment 5 further comprising: operating the second Pod in a standby mode of operation, said operating the second Pod in a standby mode of operation including operating the second Pod to monitor the operation of the first Pod for a first condition, said first condition being indicative of a failure of the first Pod.

Method Embodiment 6A. The method of method embodiment 6, wherein said first condition being indicative of a failure of the first Pod includes one of the following: (i) a failure to receive at the second Pod from the first Pod heartbeat signals, or (ii) a failure to receive at the second Pod from the first Pod responses to health check messages communicated from the second Pod to the first Pod.

Method Embodiment 6B. The method of method embodiment 6A, wherein when said first Pod fails said first node continues to operate.

Method Embodiment 7. The method of method embodiment 6 further comprising: in response to the second Pod detecting the failure of the first Pod, initiating a migration procedure to change the allocation of said second network interface from said first Pod to said second Pod.

Method Embodiment 7A. The method of method embodiment 7, wherein said migration procedure is used by entities in the Kubernetes system to change the allocation of said second network interface from said first Pod to said second Pod.

Method Embodiment 8. The method of method embodiment 7 wherein said migration procedure to change the allocation of said second network interface from said first Pod to said second Pod includes: communicating from the second Pod a first request to delete or de-allocate the second network interface from being allocated to the first Pod; and requesting by the second Pod that the second network interface be allocated to the second Pod after receiving a confirmation at the second Pod that the second network interface has been deleted or de-allocated from being allocated to the first Pod.

Method Embodiment 9. The method of method embodiment 8 further comprising: switching by the second Pod from a standby mode of operation to an active mode of operation after receiving notice at the second Pod that the second network interface has been allocated to the second Pod, said active mode of operation including providing services to entities and devices external to the Kubernetes system using the second network interface.

Method Embodiment 10. The method of method embodiment 9, wherein prior to said migration of said second network interface from said first Pod to said second Pod, messages received at said second network interface Internet Protocol address from entities and devices external to said Kubernetes system are communicated to said first Pod; and wherein after said migration of said second network interface from said first Pod to said second Pod, messages received at said second network interface Internet Protocol address from entities and devices external to said Kubernetes system are communicated to said second Pod.

Method Embodiment 11. The method of method embodiment 10, wherein said first service is a Session Border Controller service; and wherein said first Pod and said second Pod of the first service provide Session Border Controller services in response to requests when operating in an active mode of operation.

Method Embodiment 12. The method of method embodiment 10 further comprising: establishing on said first node a first Interface Cleanup Service Pod; establishing on said second node a second Interface Cleanup Service Pod; and wherein said communicating from the second Pod a first request to delete or de-allocate the second network interface from being allocated to the first Pod includes communicating said request to delete or de-allocate the second network interface from being allocated to the first Pod from the second Pod to the second Interface Cleanup Service Pod; and communicating, by the second Interface Cleanup Service Pod, a second request from the second Interface Cleanup Service Pod on the second node to the first Interface Cleanup Service Pod on the first node in response to receiving at the second Interface Cleanup Service Pod the first request to delete or de-allocate the second network interface from being allocated to the first Pod, said second request being based on said first request and specifying the second network interface to be deleted or de-allocated.

Method Embodiment 13. The method of method embodiment 12 further comprising: invoking, by the first Interface Cleanup Service Pod, a first Container Network Interface Plug-in application executing on the first node to delete or de-allocate the second network interface from being allocated to the first Pod in response to receiving by the first Interface Cleanup Service Pod the second request to delete or de-allocate the second network interface from being allocated to the first Pod.

Method Embodiment 14. The method of method embodiment 13 further comprising: communicating a first notification from the first Interface Cleanup Service Pod to the second Interface Cleanup Service Pod that the second network interface has been deleted or de-allocated from being allocated to said first Pod; communicating by the second Interface Cleanup Service Pod to the second Pod said confirmation that the second network interface has been deleted or de-allocated from being allocated to the first Pod in response to receiving by the second Interface Cleanup Service Pod the first notification from the first Interface Cleanup Service Pod.

Method Embodiment 15. The method of method embodiment 14, wherein said requesting that the second network interface be allocated to the second Pod includes the second Pod invoking a second Container Network Interface Plug-in application executing on the second node to allocate the second network interface to the second Pod.

Method Embodiment 16. A method of operating a Kubernetes system comprising: establishing, by the Kubernetes system, a first service, said first service including a first Pod located on a first node and a second Pod located on a second node; allocating by the Kubernetes system an external network interface including an Internet Protocol address for use by the first Pod to communicate with other entities, the allocation of said external network interface for use by the first Pod being unknown to a first Kubelet managing the first node; and upon failure of the first Pod, changing allocation of the external network interface from the first Pod to the second Pod.

Method Embodiment 16A. The method of method embodiment 16, wherein said other entities are entities which are internal and/or external to the Kubernetes system.

Method Embodiment 16B. The method of method embodiment 16, wherein said other entities are devices external to the Kubernetes system.

Method Embodiment 17. The method of method embodiment 16, wherein the first Pod is an Active Pod and the second Pod is a Standby Pod, the Standby Pod becoming active or being activated upon detection of the failure of the first Pod.

Method Embodiment 18. The method of method embodiment 17, wherein the first node continues to function after the first Pod has failed.

Second List of Numbered Exemplary Method Embodiments

Method Embodiment 1. A method of operating a Kubernetes system comprising: establishing, by the Kubernetes system, a first service, said first service including a first Pod and a second Pod, said first Pod being located on a first Kubernetes node of the Kubernetes system and said second Pod being located on a second Kubernetes node of the Kubernetes system, said establishing a first service including initializing said first Pod and initializing said second Pod; said initializing said first Pod including allocating by the Kubernetes system a first network interface of the Kubernetes system for use by the first Pod to communicate with entities within the Kubernetes system, said first network interface including a first Internet Protocol address, said allocation of the first network interface to the first Pod being known to a first Kubelet managing said first Kubernetes node; after initialization of said first Pod allocating by the Kubernetes system a second Internet Protocol (IP) address for use by the first Pod, said allocation of said second IP address for use by the first Pod being unknown to the first Kubelet managing said first Kubernetes node, said second IP address being for an external network interface; upon failure of the first Pod, changing allocation of said second IP address from said first Pod to said second Pod.

Method Embodiment 2. The method of method embodiment 1, wherein when said first Pod is in an Active mode of operation, the first Pod provides services in response to requests received on the second IP address; and wherein when said second Pod is in a Standby mode of operation, the second Pod does not provide services.

Method Embodiment 3. The method of method embodiment 1, wherein said first service is a Session Border Controller service; and wherein said first and second Pods of the first service provide Session Border Controller services when in an active mode of operation.

Method Embodiment 3A. The method of method embodiment 1, wherein said first and second Pods of the first service do not provide Session Border Controller services when in a standby mode of operation.

Method Embodiment 4. The method of method embodiment 3 further comprising: determining that the first Pod of the first service is to operate in an active mode of operation and that the second Pod of the first service is to operate in a standby mode of operation.

Method Embodiment 5. The method of method embodiment 1 further comprising: operating the first Pod in an active mode of operation, said operating the first Pod in an active mode of operation including providing services to entities and devices external to the Kubernetes system using the second IP address.

Method Embodiment 6. The method of method embodiment 5 further comprising: operating the second Pod in a standby mode of operation, said operating the second Pod in a standby mode of operation including operating the second Pod to monitor the operation of the first Pod for a first condition, said first condition being indicative of a failure of the first Pod.

Method Embodiment 6A. The method of method embodiment 6, wherein said first condition being indicative of a failure of the first Pod includes one of the following: (i) a failure to receive at the second Pod from the first Pod heartbeat signals, or (ii) a failure to receive at the second Pod from the first Pod responses to health check messages communicated from the second Pod to the first Pod.

Method Embodiment 6B. The method of method embodiment 6A, wherein when said first Pod fails said first node continues to operate.

Method Embodiment 7. The method of method embodiment 6 further comprising: in response to the second Pod detecting the failure of the first Pod, initiating a migration procedure to change the allocation of said second IP address from said first Pod to said second Pod.

Method Embodiment 7A. The method of method embodiment 7, wherein said migration procedure is used by entities in the Kubernetes system to change the allocation of said second IP address from said first Pod to said second Pod.

Method Embodiment 8. The method of method embodiment 7 wherein said migration procedure to change the allocation of said second IP address from said first Pod to said second Pod includes: communicating from the second Pod a first request to delete or de-allocate the second IP address from being allocated to the first Pod; and requesting by the second Pod that the second IP address be allocated to the second Pod after receiving a confirmation at the second Pod that the second network interface has been deleted or de-allocated from being allocated to the first Pod.

Method Embodiment 9. The method of method embodiment 8 further comprising: switching by the second Pod from a standby mode of operation to an active mode of operation after receiving notice at the second Pod that the second IP address has been allocated to the second Pod, said active mode of operation including providing services to entities and devices external to the Kubernetes system using the second IP address.

Method Embodiment 10. The method of method embodiment 9, wherein prior to said migration of said second IP address from said first Pod to said second Pod, messages received at said second Internet Protocol address from entities and devices external to said Kubernetes system are communicated to said first Pod; and wherein after said migration of said second IP address from said first Pod to said second Pod, messages received at said second Internet Protocol address from entities and devices external to said Kubernetes system are communicated to said second Pod.

Method Embodiment 11. The method of method embodiment 10, wherein said first service is a Session Border Controller service; and wherein said first Pod and said second Pod of the first service provide Session Border Controller services in response to requests when operating in an active mode of operation.

Method Embodiment 12. The method of method embodiment 10 further comprising: establishing on said first node a first Interface Cleanup Service Pod; establishing on said second node a second Interface Cleanup Service Pod; and wherein said communicating from the second Pod a first request to delete or de-allocate the second IP address from being allocated to the first Pod includes communicating said request to delete or de-allocate the second IP address from being allocated to the first Pod from the second Pod to the second Interface Cleanup Service Pod; and communicating, by the second Interface Cleanup Service Pod, a second request from the second Interface Cleanup Service Pod on the second node to the first Interface Cleanup Service Pod on the first node in response to receiving at the second Interface Cleanup Service Pod the first request to delete or de-allocate the second IP address from being allocated to the first Pod, said second request being based on said first request and specifying the second IP address to be deleted or de-allocated.

Method Embodiment 13. The method of method embodiment 12 further comprising: invoking, by the first Interface Cleanup Service Pod, a first Container Network Interface Plug-in application executing on the first node to delete or de-allocate the second IP address from being allocated to the first Pod in response to receiving by the first Interface Cleanup Service Pod the second request to delete or de-allocate the second IP address from being allocated to the first Pod.

Method Embodiment 14. The method of method embodiment 13 further comprising: communicating a first notification from the first Interface Cleanup Service Pod to the second Interface Cleanup Service Pod that the second IP address has been deleted or de-allocated from being allocated to said first Pod; communicating by the second Interface Cleanup Service Pod to the second Pod said confirmation that the second IP address has been deleted or de-allocated from being allocated to the first Pod in response to receiving by the second Interface Cleanup Service Pod the first notification from the first Interface Cleanup Service Pod.

Method Embodiment 15. The method of method embodiment 14, wherein said requesting that the second IP address be allocated to the second Pod includes the second Pod invoking a second Container Network Interface Plug-in application executing on the second node to allocate the second IP address to the second Pod.

Method Embodiment 16. A method of operating a Kubernetes system comprising: establishing, by the Kubernetes system, a first service, said first service including a first Pod located on a first node and a second Pod located on a second node; allocating by the Kubernetes system an Internet Protocol address for use by the first Pod to communicate with other entities, the allocation of said Internet Protocol address for use by the first Pod being unknown to a first Kubelet managing the first Kubernetes node; and upon failure of the first Pod, changing allocation of the external network interface from the first Pod to the second Pod.

Method Embodiment 16A. The method of method embodiment 16, wherein said other entities are entities which are internal and/or external to the Kubernetes system.

Method Embodiment 16B. The method of method embodiment 16, wherein said other entities are devices external to the Kubernetes system.

Method Embodiment 17. The method of method embodiment 16, wherein the first Pod is an Active Pod and the second Pod is a Standby Pod, the Standby Pod being active upon detection of the failure of the first Pod.

Method Embodiment 18. The method of method embodiment 17, wherein the first Kubernetes node continues to function after the first Pod has failed.

First List of Numbered Exemplary System Embodiments

System Embodiment 1. A Kubernetes system comprising: one or more processors, said one or more processors controlling said Kubernetes system to: establish a first service, said first service including a first Pod and a second Pod, said first Pod being located on a first Kubernetes node of the Kubernetes system and said second Pod being located on a second Kubernetes node of the Kubernetes system, said establish a first service including initializing said first Pod and initializing said second Pod; said initializing said first Pod including allocating by the Kubernetes system a first network interface of the Kubernetes system for use by the first Pod to communicate with entities within the Kubernetes system, said first network interface including a first Internet Protocol address, said allocation of the first network interface to the first Pod being known to a first Kubelet managing said first node; allocate, after initialization of said first Pod, a second network interface including a second Internet Protocol address for use by the first Pod, the allocation of said second network interface for use by the first Pod being unknown to the first Kubelet managing said first node, the second network interface being an external network interface; upon failure of the first Pod, change allocation of said second network interface from said first Pod to said second Pod.

System Embodiment 2. The Kubernetes system of system embodiment 1, wherein when said first Pod is in an Active mode of operation, the first Pod provides services in response to requests received on the second network interface; and wherein when said second Pod is in a Standby mode of operation, the second Pod does not provide services.

System Embodiment 3. The Kubernetes system of system embodiment 1, wherein said first service is a Session Border Controller service; and wherein said first and second Pods of the first service provide Session Border Controller services when in an active mode of operation.

System Embodiment 3A. The Kubernetes system of system embodiment 1, wherein said first and second Pods of the first service do not provide Session Border Controller services when in a standby mode of operation.

System Embodiment 4. The Kubernetes system of system embodiment 3, wherein said one or more processors further control the Kubernetes system to: determine that the first Pod of the first service is to operate in an active mode of operation and that the second Pod of the first service is to operate in a standby mode of operation.

System Embodiment 5. The Kubernetes system of system embodiment 1, wherein said one or more processors further control the Kubernetes system to: operate the first Pod in an active mode of operation, said operating the first Pod in an active mode of operation including providing services to entities and devices external to the Kubernetes system using the second network interface.

System Embodiment 6. The Kubernetes system of system embodiment 5, wherein said one or more processors further control the Kubernetes system to: operate the second Pod in a standby mode of operation, said operating the second Pod in a standby mode of operation including operating the second Pod to monitor the operation of the first Pod for a first condition, said first condition being indicative of a failure of the first Pod.

System Embodiment 6A. The Kubernetes system of system embodiment 6, wherein said first condition being indicative of a failure of the first Pod includes one of the following: (i) a failure to receive at the second Pod from the first Pod heartbeat signals, or (ii) a failure to receive at the second Pod from the first Pod responses to health check messages communicated from the second Pod to the first Pod.

System Embodiment 7. The Kubernetes system of system embodiment 6 wherein said one or more processors further control the Kubernetes system to: initiate a migration procedure to change the allocation of said second network interface from said first Pod to said second Pod in response to the second Pod detecting the failure of the first Pod.

System Embodiment 7A. The Kubernetes system of system embodiment 7, wherein said migration procedure is used by entities in the Kubernetes system to change the allocation of said second network interface from said first Pod to said second Pod.

System Embodiment 8. The Kubernetes system of system embodiment 7, wherein said migration procedure to change the allocation of said second network interface from said first Pod to said second Pod includes: communicating from the second Pod a first request to delete or de-allocate the second network interface from being allocated to the first Pod; and requesting by the second Pod that the second network interface be allocated to the second Pod after receiving a confirmation at the second Pod that the second network interface has been deleted or de-allocated from being allocated to the first Pod.

System Embodiment 9. The Kubernetes system of system embodiment 8, wherein said one or more processors further control the Kubernetes system to: switch by the second Pod from a standby mode of operation to an active mode of operation after receiving notice at the second Pod that the second network interface has been allocated to the second Pod, said active mode of operation including providing services to entities and devices external to the Kubernetes system using the second network interface.

System Embodiment 10. The Kubernetes system of system embodiment 9, wherein prior to said migration of said second network interface from said first Pod to said second Pod, messages received at said second network interface Internet Protocol address from entities and devices external to said Kubernetes system are communicated to said first Pod; and wherein after said migration of said second network interface from said first Pod to said second Pod, messages received at said second network interface Internet Protocol address from entities and devices external to said Kubernetes system are communicated to said second Pod.

System Embodiment 11. The Kubernetes system of system embodiment 10, wherein said first service is a Session Border Controller service; and wherein said first Pod and said second Pod of the first service provide Session Border Controller services in response to requests when operating in an active mode of operation.

System Embodiment 12. The Kubernetes system of system embodiment 10 wherein said one or more processors further control the Kubernetes system to: establish on said first node a first Interface Cleanup Service Pod; establish on said second node a second Interface Cleanup Service Pod; and wherein said communicating from the second Pod a first request to delete or de-allocate the second network interface from being allocated to the first Pod includes communicating from the second Pod to the second Interface Cleanup Service Pod said request to delete or de-allocate the second network interface from being allocated to the first Pod; and communicate, by the second Interface Cleanup Service Pod, a second request from the second Interface Cleanup Service Pod on the second node to the first Interface Cleanup Service Pod on the first node in response to receiving at the second Interface Cleanup Service Pod the first request to delete or de-allocate the second network interface from being allocated to the first Pod, said second request being based on said first request and specifying the second network interface to be deleted or de-allocated.

System Embodiment 13. The Kubernetes system of system embodiment 12 wherein said one or more processors further control the Kubernetes system to: invoke, by the first Interface Cleanup Service Pod, a first Container Network Interface Plug-in application executing on the first node to delete or de-allocate the second network interface from being allocated to the first Pod in response to receiving by the first Interface Cleanup Service Pod the second request to delete or de-allocate the second network interface from being allocated to the first Pod.

System Embodiment 14. The Kubernetes system of system embodiment 13 wherein said one or more processors further control the Kubernetes system to: communicate a first notification from the first Interface Cleanup Service Pod to the second Interface Cleanup Service Pod that the second network interface has been deleted or de-allocated from being allocated to said first Pod; communicate by the second Interface Cleanup Service Pod to the second Pod said confirmation that the second network interface has been deleted or de-allocated from being allocated to the first Pod in response to receiving by the second Interface Cleanup Service Pod the first notification from the first Interface Cleanup Service Pod.

System Embodiment 15. The Kubernetes system of system embodiment 14, wherein said requesting that the second network interface be allocated to the second Pod includes the second Pod invoking a second Container Network Interface Plug-in application executing on the second node to allocate the second network interface to the second Pod.

System Embodiment 16. A Kubernetes system comprising: one or more processors, said one or more processors controlling said Kubernetes system to: establish, by the Kubernetes system, a first service, said first service including a first Pod located on a first node and a second Pod located on a second node; allocate, by the Kubernetes system, an external network interface including an Internet Protocol address for use by the first Pod to communicate with other entities, the allocation of said external network interface for use by the first Pod being unknown to a first Kubelet managing the first node; and upon failure of the first Pod, change allocation of the external network interface from the first Pod to the second Pod.

System Embodiment 16A. The Kubernetes system of system embodiment 16, wherein said other entities are entities which are internal and/or external to the Kubernetes system.

System Embodiment 16B. The Kubernetes system of system embodiment 16, wherein said other entities are devices external to the Kubernetes system.

System Embodiment 17. The Kubernetes system of system embodiment 16, wherein the first Pod is an Active Pod and the second Pod is a Standby Pod, the Standby Pod becoming active upon detection of the failure of the first Pod.

System Embodiment 18. The Kubernetes system of system embodiment 17, wherein the first node continues to function after the first Pod has failed.

Second List of Numbered Exemplary System Embodiments

System Embodiment 1. A Kubernetes system comprising: one or more processors, said one or more processors controlling said Kubernetes system to: establish a first service, said first service including a first Pod and a second Pod, said first Pod being located on a first Kubernetes node of the Kubernetes system and said second Pod being located on a second Kubernetes node of the Kubernetes system, said establish a first service including initializing said first Pod and initializing said second Pod; said initializing said first Pod including allocating by the Kubernetes system a first network interface of the Kubernetes system for use by the first Pod to communicate with entities within the Kubernetes system, said first network interface including a first Internet Protocol (IP) address, said allocation of the first network interface to the first Pod being known to a first Kubelet managing said first node; allocate, after initialization of said first Pod, a second IP address for use by the first Pod, the allocation of said second IP address for use by the first Pod being unknown to the first Kubelet managing said first node, the IP address being for an external network interface; upon failure of the first Pod, change allocation of said second IP address from said first Pod to said second Pod.

System Embodiment 2. The Kubernetes system of system embodiment 1, wherein when said first Pod is in an Active mode of operation, the first Pod provides services in response to requests received on the second IP address; and wherein when said second Pod is in a Standby mode of operation, the second Pod does not provide services.

System Embodiment 3. The Kubernetes system of system embodiment 1, wherein said first service is a Session Border Controller service; and wherein said first and second Pods of the first service provide Session Border Controller services when in an active mode of operation.

System Embodiment 3A. The Kubernetes system of system embodiment 1, wherein said first and second Pods of the first service do not provide Session Border Controller services when in a standby mode of operation.

System Embodiment 4. The Kubernetes system of system embodiment 3, wherein said one or more processors further control the Kubernetes system to: determine that the first Pod of the first service is to operate in an active mode of operation and that the second Pod of the first service is to operate in a standby mode of operation.

System Embodiment 5. The Kubernetes system of system embodiment 1, wherein said one or more processors further control the Kubernetes system to: operate the first Pod in an active mode of operation, said operating the first Pod in an active mode of operation including providing services to entities and devices external to the Kubernetes system using the second IP address.

System Embodiment 6. The Kubernetes system of system embodiment 5, wherein said one or more processors further control the Kubernetes system to: operate the second Pod in a standby mode of operation, said operating the second Pod in a standby mode of operation including operating the second Pod to monitor the operation of the first Pod for a first condition, said first condition being indicative of a failure of the first Pod.

System Embodiment 6A. The Kubernetes system of system embodiment 6, wherein said first condition being indicative of a failure of the first Pod includes one of the following: (i) a failure to receive at the second Pod from the first Pod heartbeat signals, or (ii) a failure to receive at the second Pod from the first Pod responses to health check messages communicated from the second Pod to the first Pod.

System Embodiment 7. The Kubernetes system of system embodiment 6 wherein said one or more processors further control the Kubernetes system to: initiate a migration procedure to change the allocation of said second IP address from said first Pod to said second Pod in response to the second Pod detecting the failure of the first Pod.

System Embodiment 7A. The Kubernetes system of system embodiment 7, wherein said migration procedure is used by entities in the Kubernetes system to change the allocation of said second IP address from said first Pod to said second Pod.

System Embodiment 8. The Kubernetes system of system embodiment 7, wherein said migration procedure to change the allocation of said second IP address from said first Pod to said second Pod includes: communicating from the second Pod a first request to delete or de-allocate the second IP address from being allocated to the first Pod; and requesting by the second Pod that the second IP address be allocated to the second Pod after receiving a confirmation at the second Pod that the second IP address has been deleted or de-allocated from being allocated to the first Pod.

System Embodiment 9. The Kubernetes system of system embodiment 8, wherein said one or more processors further control the Kubernetes system to: switch by the second Pod from a standby mode of operation to an active mode of operation after receiving notice at the second Pod that the second IP address has been allocated to the second Pod, said active mode of operation including providing services to entities and devices external to the Kubernetes system using the second IP address System Embodiment 10. The Kubernetes system of system embodiment 9, wherein prior to said migration of said second IP address from said first Pod to said second Pod, messages received at said second IP address from entities and devices external to said Kubernetes system are communicated to said first Pod; and wherein after said migration of said second IP address from said first Pod to said second Pod, messages received at said second IP address from entities and devices external to said Kubernetes system are communicated to said second Pod.

System Embodiment 11. The Kubernetes system of system embodiment 10, wherein said first service is a Session Border Controller service; and wherein said first Pod and said second Pod of the first service provide Session Border Controller services in response to requests when operating in an active mode of operation.

System Embodiment 12. The Kubernetes system of system embodiment 10 wherein said one or more processors further control the Kubernetes system to: establish on said first node a first Interface Cleanup Service Pod; establish on said second node a second Interface Cleanup Service Pod; and wherein said communicating from the second Pod a first request to delete or de-allocate the second IP address from being allocated to the first Pod includes communicating from the second Pod to the second Interface Cleanup Service Pod said request to delete or de-allocate the second IP address from being allocated to the first Pod; and communicate, by the second Interface Cleanup Service Pod, a second request from the second Interface Cleanup Service Pod on the second node to the first Interface Cleanup Service Pod on the first node in response to receiving at the second Interface Cleanup Service Pod the first request to delete or de-allocate the second IP address from being allocated to the first Pod, said second request being based on said first request and specifying the second IP address to be deleted or de-allocated.

System Embodiment 13. The Kubernetes system of system embodiment 12 wherein said one or more processors further control the Kubernetes system to: invoke, by the first Interface Cleanup Service Pod, a first Container Network Interface Plug-in application executing on the first node to delete or de-allocate the second IP address from being allocated to the first Pod in response to receiving by the first Interface Cleanup Service Pod the second request to delete or de-allocate the second IP address from being allocated to the first Pod.

System Embodiment 14. The Kubernetes system of system embodiment 13 wherein said one or more processors further control the Kubernetes system to: communicate a first notification from the first Interface Cleanup Service Pod to the second Interface Cleanup Service Pod that the second IP address has been deleted or de-allocated from being allocated to said first Pod; communicate by the second Interface Cleanup Service Pod to the second Pod said confirmation that the second IP address has been deleted or de-allocated from being allocated to the first Pod in response to receiving by the second Interface Cleanup Service Pod the first notification from the first Interface Cleanup Service Pod.

System Embodiment 15. The Kubernetes system of system embodiment 14, wherein said requesting that the second IP address be allocated to the second Pod includes the second Pod invoking a second Container Network Interface Plug-in application executing on the second node to allocate the second IP address to the second Pod.

System Embodiment 16. A Kubernetes system comprising: one or more processors, said one or more processors controlling said Kubernetes system to: establish, by the Kubernetes system, a first service, said first service including a first Pod located on a first node and a second Pod located on a second node; allocate, by the Kubernetes system, an Internet Protocol (IP) address for use by the first Pod to communicate with other entities, the allocation of said IP address for use by the first Pod being unknown to a first Kubelet managing the first node; and upon failure of the first Pod, change allocation of the IP address from the first Pod to the second Pod.

System Embodiment 16A. The Kubernetes system of system embodiment 16, wherein said other entities are entities which are internal and/or external to the Kubernetes system.

System Embodiment 16B. The Kubernetes system of system embodiment 16, wherein said other entities are devices external to the Kubernetes system.

System Embodiment 17. The Kubernetes system of system embodiment 16, wherein the first Pod is an Active Pod and the second Pod is a Standby Pod, the Standby Pod becoming active or becoming an Active Pod upon detection of the failure of the first Pod.

System Embodiment 18. The Kubernetes system of system embodiment 17, wherein the first node continues to function after the first Pod has failed.

List of Numbered Exemplary Non-Transitory Computer Readable Medium Embodiments

Non-transitory computer readable medium embodiment 1. A non-transitory computer readable medium including a first set of computer executable instructions which when executed by one or more processors of a Kubernetes system cause the Kubernetes system to: establish a first service, said first service including a first Pod and a second Pod, said first Pod being located on a first Kubernetes node of the Kubernetes system and said second Pod being located on a second Kubernetes node of the Kubernetes system, said establish a first service including initializing said first Pod and initializing said second Pod; said initializing said first Pod including allocating by the Kubernetes system a first network interface of the Kubernetes system for use by the first Pod to communicate with entities within the Kubernetes system, said first network interface including a first Internet Protocol address, said allocation of the first network interface to the first Pod being known to a first Kubelet managing said first node; allocate, after initialization of said first Pod, a second external network interface including a second Internet Protocol address for use by the first Pod, the allocation of said second network interface for use by the first Pod being unknown to the first Kubelet managing said first node, said second IP address being for an external network interface; upon failure of the first Pod, change allocation of said second network interface from said first Pod to said second Pod.

Non-transitory computer readable medium embodiment 2. A non-transitory computer readable medium including a first set of computer executable instructions which when executed by one or more processors of a Kubernetes system cause the Kubernetes system to: establish a first service, said first service including a first Pod and a second Pod, said first Pod being located on a first Kubernetes node of the Kubernetes system and said second Pod being located on a second Kubernetes node of the Kubernetes system, said establish a first service including initializing said first Pod and initializing said second Pod; said initializing said first Pod including allocating by the Kubernetes system a first network interface of the Kubernetes system for use by the first Pod to communicate with entities within the Kubernetes system, said first network interface including a first Internet Protocol address, said allocation of the first network interface to the first Pod being known to a first Kubelet managing said first node; allocate, after initialization of said first Pod, a second Internet Protocol address for use by the first Pod, the allocation of said second IP address for use by the first Pod being unknown to the first Kubelet managing said first Kubernetes node, said second IP address being for an external network interface; upon failure of the first Pod, change allocation of said second IP address from said first Pod to said second Pod.

The techniques of various embodiments may be implemented using software, hardware and/or a combination of software and hardware. Various embodiments are directed to apparatus, e.g., Kubernetes system devices, nodes and/or network equipment devices. Various embodiments are also directed to methods, e.g., method of controlling and/or operating Kubernetes system devices, nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or, in some embodiments, logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., node and/or network equipment device, including a processor configured to implement one, multiple or all of the steps of one or more methods of the invention.

In some embodiments, the processor or processors, e.g., CPUs, of one or more devices, e.g., computing nodes such as Kubernetes nodes, are configured to perform the steps of the methods described as being performed by the nodes and/or network equipment devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as Kubernetes node and/or network equipment devices with a processor which includes a component corresponding to each of the steps of the various described methods performed by the device in which the processor is included. In some but not all embodiments a device, e.g., computing node such as a Kubernetes node and/or network equipment devices, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a node or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a Kubernetes system comprising:
   establishing, by the Kubernetes system, a first service, said first service including a first Pod and a second Pod, said first Pod being located on a first Kubernetes node of the Kubernetes system and said second Pod being located on a second Kubernetes node of the Kubernetes system, said establishing a first service including initializing said first Pod and initializing said second Pod;
   said initializing said first Pod including allocating, by the Kubernetes system, a first network interface of the Kubernetes system for use by the first Pod to communicate with entities within the Kubernetes system, said first network interface including a first Internet Protocol address, said allocation of the first network interface to the first Pod being known to a first Kubelet managing said first Kubernetes node;
   establishing, on said first Kubernetes node, a first Interface Cleanup Service Pod;
   after initialization of said first Pod allocating by the Kubernetes system a second network interface including a second Internet Protocol address for use by the first Pod, said allocation of said second network interface for use by the first Pod being unknown to the first Kubelet managing said first Kubernetes node, said second network interface being an external network interface;
   upon failure of the first Pod, changing allocation of said second network interface from said first Pod to said second Pod, and
   wherein said changing allocation of said second network interface from said first Pod to said second Pod includes: operating the first Interface Cleanup Service Pod to delete or de-allocate the second network interface from being allocated to the first Pod.

2. The method of claim 1 further comprising:
   operating the first Pod in an active mode of operation, said operating the first Pod in an active mode of operation including providing services to entities and devices external to the Kubernetes system using the second network interface.

3. The method of claim 2 further comprising:
   operating the second Pod in a standby mode of operation, said operating the second Pod in a standby mode of operation including operating the second Pod to monitor the operation of the first Pod for a first condition, said first condition being indicative of a failure of the first Pod.

4. The method of claim 3 further comprising:
   in response to the second Pod detecting the failure of the first Pod, initiating a migration procedure to change the allocation of said second network interface from said first Pod to said second Pod.

5. The method of claim 4 wherein said migration procedure to change the allocation of said second network interface from said first Pod to said second Pod includes:
   communicating from the second Pod a first request to delete or de-allocate the second network interface from being allocated to the first Pod; and
   requesting, by the second Pod, that the second network interface be allocated to the second Pod after receiving a confirmation at the second Pod that the second network interface has been deleted or de-allocated from being allocated to the first Pod.

6. The method of claim 5 further comprising:
   switching, by the second Pod, from a standby mode of operation to an active mode of operation after receiving notice at the second Pod that the second network interface has been allocated to the second Pod, said active mode of operation including providing services to entities and devices external to the Kubernetes system using the second network interface.

7. The method of claim 6,
   wherein prior to said migration of said second network interface from said first Pod to said second Pod, messages received at said second network interface second Internet Protocol address from entities and devices external to said Kubernetes system are communicated to said first Pod; and
   wherein after said migration of said second network interface from said first Pod to said second Pod, messages received at said second network interface second Internet Protocol address from entities and devices external to said Kubernetes system are communicated to said second Pod.

8. The method of claim 7,
wherein said first service is a Session Border Controller service; and
wherein said first Pod and said second Pod of the first service provide Session Border Controller services in response to requests when operating in an active mode of operation.

9. The method of claim 7 further comprising:
establishing, on said second Kubernetes node, a second Interface Cleanup Service Pod; and
wherein said communicating from the second Pod a first request to delete or de-allocate the second network interface from being allocated to the first Pod includes communicating from the second Pod to the second Interface Cleanup Service Pod said first request to delete or de-allocate the second network interface from being allocated to the first Pod; and
communicating, by the second Interface Cleanup Service Pod, a second request from the second Interface Cleanup Service Pod on the second Kubernetes node to the first Interface Cleanup Service Pod on the first Kubernetes node in response to receiving at the second Interface Cleanup Service Pod the first request to delete or de-allocate the second network interface from being allocated to the first Pod, said second request being based on said first request and specifying the second network interface to be deleted or de-allocated.

10. A Kubernetes system comprising:
one or more processors, said one or more processors controlling said Kubernetes system to:
establish a first service, said first service including a first Pod and a second Pod, said first Pod being located on a first Kubernetes node of the Kubernetes system and said second Pod being located on a second Kubernetes node of the Kubernetes system, said establish a first service including initializing said first Pod and initializing said second Pod;
said initializing said first Pod including allocating, by the Kubernetes system, a first network interface of the Kubernetes system for use by the first Pod to communicate with entities within the Kubernetes system, said first network interface including a first Internet Protocol address, said allocation of the first network interface to the first Pod being known to a first Kubelet managing said first node;
establish, on said first Kubernetes node, a first Interface Cleanup Service Pod;
allocate, after initialization of said first Pod, a second network interface including a second Internet Protocol address for use by the first Pod, the allocation of said second network interface for use by the first Pod being unknown to the first Kubelet managing said first node, the second network interface being an external network interface;
upon failure of the first Pod, change allocation of said second network interface from said first Pod to said second Pod; and
wherein said changing allocation of said second network interface from said first Pod to said second Pod includes: operating the first Interface Cleanup Service Pod to delete or de-allocate the second network interface from being allocated to the first Pod.

11. The Kubernetes system of claim 10, wherein said one or more processors further control the Kubernetes system to:
operate the first Pod in an active mode of operation, said operating the first Pod in an active mode of operation including providing services to entities and devices external to the Kubernetes system using the second network interface.

12. The Kubernetes system of claim 11, wherein said one or more processors further control the Kubernetes system to:
operate the second Pod in a standby mode of operation, said operating the second Pod in a standby mode of operation including operating the second Pod to monitor the operation of the first Pod for a first condition, said first condition being indicative of a failure of the first Pod.

13. The Kubernetes system of claim 12, wherein said one or more processors further control the Kubernetes system to:
initiate a migration procedure to change the allocation of said second network interface from said first Pod to said second Pod in response to the second Pod detecting the failure of the first Pod.

14. The Kubernetes system of claim 13, wherein said migration procedure to change the allocation of said second network interface from said first Pod to said second Pod includes:
communicating from the second Pod a first request to delete or de-allocate the second network interface from being allocated to the first Pod; and
requesting by the second Pod that the second network interface be allocated to the second Pod after receiving a confirmation at the second Pod that the second network interface has been deleted or de-allocated from being allocated to the first Pod.

15. The Kubernetes system of claim 14, wherein said one or more processors further control the Kubernetes system to:
switch, by the second Pod, from a standby mode of operation to an active mode of operation after receiving notice at the second Pod that the second network interface has been allocated to the second Pod, said active mode of operation including providing services to entities and devices external to the Kubernetes system using the second network interface.

16. The Kubernetes system of claim 10,
wherein said first service is a Session Border Controller service; and
wherein said first Pod and said second Pod of the first service provide Session Border Controller services in response to requests when operating in an active mode of operation.

17. A non-transitory computer readable medium including a first set of computer executable instructions which when executed by one or more processors of a Kubernetes system cause the Kubernetes system to:
establish a first service, said first service including a first Pod and a second Pod, said first Pod being located on a first Kubernetes node of the Kubernetes system and said second Pod being located on a second Kubernetes node of the Kubernetes system, said establish a first service including initializing said first Pod and initializing said second Pod, said initializing said first Pod including allocating by the Kubernetes system a first network interface of the Kubernetes system for use by the first Pod to communicate with entities within the Kubernetes system, said first network interface including a first Internet Protocol address, said allocation of the first network interface to the first Pod being known to a first Kubelet managing said first node;
establish, on said first Kubernetes node, a first Interface Cleanup Service Pod;
allocate, after initialization of said first Pod, a second external network interface including a second Internet Protocol address for use by the first Pod, the allocation of said second network interface for use by the first Pod being unknown to the first Kubelet managing said first node, said second Internet Protocol address being for an external network interface;

upon failure of the first Pod, change allocation of said second network interface from said first Pod to said second Pod; and wherein said changing allocation of said second external network interface from said first Pod to said second Pod includes: operating the first Interface Cleanup Service Pod to delete or de-allocate the second external network interface from being allocated to the first Pod.

18. The method of claim 9, wherein said operating the first Interface Cleanup Service Pod to delete or de-allocate the second network interface from being allocated to the first Pod includes:

invoking, by the first Interface Cleanup Service Pod, a first Container Network Interface Plug-in application executing on the first Kubernetes node to delete or de-allocate the second Internet Protocol address from being allocated to the first Pod in response to receiving, by the first Interface Cleanup Service Pod, the second request to delete or de-allocate the second Internet Protocol address from being allocated to the first Pod.

19. The method of claim 18 further comprising:

communicating a first notification from the first Interface Cleanup Service Pod to the second Interface Cleanup Service Pod that the second Internet Protocol address has been deleted or de-allocated from being allocated to said first Pod;

communicating by the second Interface Cleanup Service Pod to the second Pod a confirmation that the second Internet Protocol address has been deleted or de-allocated from being allocated to the first Pod in response to receiving by the second Interface Cleanup Service Pod the first notification from the first Interface Cleanup Service Pod.

20. The method of claim 1, wherein the first Pod is an Active Pod and the second Pod is a Standby Pod, the Standby Pod becoming active upon detection of the failure of the first Pod; and wherein the first Kubernetes node continues to function after the first Pod has failed.

21. The Kubernetes system of claim 14, wherein said one or more processors further control the Kubernetes system to establish on said second Kubernetes node a second Interface Cleanup Service Pod;

wherein said communicating from the second Pod a first request to delete or de-allocate the second network interface from being allocated to the first Pod includes communicating from the second Pod to the second Interface Cleanup Service Pod said first request to delete or de-allocate the second network interface from being allocated to the first Pod; and wherein said one or more processors further control the Kubernetes system to communicate, by the second Interface Cleanup Service Pod, a second request from the second Interface Cleanup Service Pod on the second Kubernetes node to the first Interface Cleanup Service Pod on the first Kubernetes node in response to receiving at the second Interface Cleanup Service Pod the first request to delete or de-allocate the second network interface from being allocated to the first Pod, said second request being based on said first request and specifying the second network interface to be deleted or de-allocated.

22. The Kubernetes system of claim 21, wherein said operating the first Interface Cleanup Service Pod to delete or de-allocate the second network interface from being allocated to the first Pod includes invoking, by the first Interface Cleanup Service Pod, a first Container Network Interface Plug-in application executing on the first Kubernetes node to delete or de-allocate the second Internet Protocol address from being allocated to the first Pod in response to receiving by the first Interface Cleanup Service Pod the second request to delete or de-allocate the second Internet Protocol address from being allocated to the first Pod.

* * * * *